(12) United States Patent
Garimella et al.

(10) Patent No.: US 8,181,450 B2
(45) Date of Patent: May 22, 2012

(54) APPARATUS, SYSTEM, AND METHOD FOR REDUCING $NO_x$ EMISSIONS ON AN SCR CATALYST USING AMMONIA STORAGE AND SLIP CONTROL

(75) Inventors: Phanindra Garimella, Bloomington, IN (US); Abdul R. Ofoli, Columbus, IN (US); Timothy R. Frazier, Columbus, IN (US); Joan M. Wills, Nashville, IN (US); John N. Chi, Columbus, IN (US); Weiwen Wang, Columbus, IN (US); Andrew Osburn, Nashville, IN (US)

(73) Assignee: Cummins IP. Inc., Minneapolis, MN (US)

( * ) Notice: Subject to any disclaimer, the term of this patent is extended or adjusted under 35 U.S.C. 154(b) by 653 days.

(21) Appl. No.: 12/112,678

(22) Filed: Apr. 30, 2008

(65) Prior Publication Data
US 2009/0272104 A1    Nov. 5, 2009

(51) Int. Cl.
*F01N 3/20* (2006.01)
(52) U.S. Cl. ............................................. 60/295; 60/301
(58) Field of Classification Search .................... 60/286, 60/295, 301
See application file for complete search history.

(56) References Cited

U.S. PATENT DOCUMENTS

| | | | |
|---|---|---|---|
| 5,552,128 A | 9/1996 | Chang et al. | |
| 6,109,024 A | 8/2000 | Kinugasa et al. | |
| 6,266,955 B1 | 7/2001 | Liang et al. | |
| 6,269,633 B1 | 8/2001 | van Nieuwstadt et al. | |
| 6,295,809 B1 * | 10/2001 | Hammerle et al. | 60/286 |
| 6,311,484 B1 | 11/2001 | Roth et al. | |
| 6,375,828 B2 | 4/2002 | Ando et al. | |
| 6,415,602 B1 | 7/2002 | Patchett et al. | |
| 6,415,605 B1 | 7/2002 | Takasaki et al. | |
| 6,446,430 B1 | 9/2002 | Roth et al. | |
| 6,581,374 B2 | 6/2003 | Patchett et al. | |

(Continued)

FOREIGN PATENT DOCUMENTS

EP    1338562 A1    8/2003

(Continued)

OTHER PUBLICATIONS

PCT/US2009/042330, International Search Report and Written Opinion, Dec. 17, 2009.

(Continued)

*Primary Examiner* — Thomas Denion
*Assistant Examiner* — Jonathan Matthias
(74) *Attorney, Agent, or Firm* — Kunzler Needham Massey & Thorpe

(57) ABSTRACT

Various embodiments of an apparatus, system, and method are disclosed for reducing $NO_x$ emissions using ammonia storage on an SCR catalyst. For example, according to one representative embodiment, an apparatus for reducing $NO_x$ emissions in an engine exhaust includes a $NO_x$ reduction target module that is configured to determine a $NO_x$ reduction requirement. The apparatus also includes an ammonia storage module that is configured to determine an ammonia storage modifier. An ammonia target module of the apparatus is configured to determine an ammonia addition requirement. The ammonia target module is communicable in data receiving communication with the ammonia storage module to receive the ammonia storage modifier, which is added to the ammonia addition requirement. The apparatus also includes a reductant target module that is configured to determine a reductant injection requirement that includes an amount of reductant added to the exhaust gas stream to achieve the ammonia addition requirement.

22 Claims, 18 Drawing Sheets

U.S. PATENT DOCUMENTS

| | | |
|---|---|---|
| 6,662,553 B2 | 12/2003 | Patchett et al. |
| 6,701,707 B1 | 3/2004 | Upadhyay et al. |
| 6,713,030 B1 | 3/2004 | Chandler et al. |
| 6,742,330 B2 | 6/2004 | Genderen |
| 6,829,885 B2 | 12/2004 | Surnilla et al. |
| 6,882,929 B2 | 4/2005 | Liang et al. |
| 6,892,530 B2 | 5/2005 | Montreuil et al. |
| 6,901,745 B2 | 6/2005 | Schnaibel et al. |
| 6,928,806 B2 | 8/2005 | Tennison et al. |
| 6,981,368 B2 | 1/2006 | van Nieuwstadt et al. |
| 6,993,900 B2 | 2/2006 | Upadhyay et al. |
| 7,017,389 B2 | 3/2006 | Gouma |
| 7,093,427 B2 * | 8/2006 | van Nieuwstadt et al. ..... 60/286 |
| 7,113,835 B2 | 9/2006 | Boyden et al. |
| 7,117,046 B2 | 10/2006 | Boyden et al. |
| 7,150,145 B2 | 12/2006 | Patchett et al. |
| 7,168,243 B2 | 1/2007 | Endicott et al. |
| 7,332,135 B2 | 2/2008 | Gandhi et al. |
| 7,650,746 B2 | 1/2010 | Hu et al. |
| 7,802,419 B2 | 9/2010 | Doring |
| 2002/0044897 A1 | 4/2002 | Kakwani et al. |
| 2003/0182935 A1 * | 10/2003 | Kawai et al. ................... 60/286 |
| 2004/0112046 A1 | 6/2004 | Tumale et al. |
| 2005/0282285 A1 | 12/2005 | Radhamohan et al. |
| 2006/0086080 A1 | 4/2006 | Katogi et al. |
| 2006/0130458 A1 | 6/2006 | Solbrig |
| 2006/0155486 A1 | 7/2006 | Walsh et al. |
| 2007/0044456 A1 | 3/2007 | Upadhyay et al. |
| 2007/0137184 A1 | 6/2007 | Patchett et al. |
| 2007/0214777 A1 | 9/2007 | Allansson et al. |
| 2007/0295003 A1 | 12/2007 | Dingle et al. |
| 2008/0022658 A1 | 1/2008 | Viola et al. |
| 2008/0022659 A1 | 1/2008 | Viola et al. |
| 2008/0060348 A1 | 3/2008 | Robel et al. |
| 2008/0066455 A1 | 3/2008 | Viola et al. |
| 2008/0250774 A1 | 10/2008 | Solbrig |
| 2008/0250778 A1 | 10/2008 | Solbrig |
| 2008/0295499 A1 | 12/2008 | Driscoll et al. |
| 2009/0301066 A1 * | 12/2009 | Sindano et al. ................. 60/286 |
| 2010/0028230 A1 | 2/2010 | Gady et al. |

FOREIGN PATENT DOCUMENTS

| | | |
|---|---|---|
| EP | 1083979 B1 | 6/2004 |
| EP | 1431533 | 6/2004 |
| EP | 1339955 B1 | 8/2005 |
| EP | 1609 977 A2 | 12/2005 |
| EP | 1672192 A1 | 6/2006 |
| JP | 10118492 A | 5/1998 |
| JP | 2002327617 | 11/2002 |
| JP | 2004100700 | 4/2004 |
| JP | 2007255367 | 10/2007 |
| WO | 9955446 | 11/1999 |
| WO | 0214657 A1 | 2/2002 |
| WO | 2004000443 A1 | 12/2003 |
| WO | 2006000877 A3 | 1/2006 |
| WO | 2007066502 A1 | 6/2007 |
| WO | 2007014649 A1 | 8/2007 |

OTHER PUBLICATIONS

Control of a Urea SCR Catalytic Converter System for a Mobile Heavy Duty Diesel Engine—C.M. Schar, C.H. Onder, H.P. Geering and M. Elsener—SAE 2003-01-0776, Mar. 3-6, 2003.

PCT/US2009/067023, International Search Report and Written Opinion, Jul. 13, 2010.

PCT/US2009/067020, International Search Report and Written Opinion, Jul. 13, 2010.

PCT/US2009/042409, International Search Report and Written Opinion, Nov. 25, 2009.

PCT/US2009/042423, International Search Report and Written Opinion, Nov. 27, 2009.

P.R. Ettireddy et al. "Surface characterization studies of TiO2 supported manganese oxide catalysts for low temperature SCR of NO with NH3" Applied Catalysis B, 76 (2007).

D.A. Pena, et al. "Identification of Surface Species on Titania-Supported Manganese, Chromium, and Copper Oxide Low-Temperature SCR Catalysts": Journal of Physical Chemistry B, 108 (2004) 9927-9936.

PCT/US2010/048502, International Search Report and Written Opinion, May 23, 2011.

* cited by examiner

APPARATUS, SYSTEM, AND METHOD FOR REDUCING $NO_x$ EMISSIONS ON AN SCR CATALYST USING AMMONIA STORAGE AND SLIP CONTROL

FIELD

This disclosure relates to controlling nitrogen oxides ($NO_x$) emissions for internal combustion engines, and more particularly to apparatus, systems and methods for controlling $NO_x$ with a selective catalytic reduction (SCR) catalyst using ammonia storage on and slip control from the SCR catalyst.

BACKGROUND

Emissions regulations for internal combustion engines have become more stringent over recent years. The regulated emissions of $NO_x$ and particulates from internal combustion engines are low enough that in many cases the emissions levels cannot be met with improved combustion technologies. Therefore, the use of aftertreatment systems on engines to reduce emissions is increasing. For reducing $NO_x$ emissions, $NO_x$ reduction catalysts, including selective catalytic reduction (SCR) systems, are utilized to convert $NO_x$ (NO and $NO_2$ in some fraction) to $N_2$ and other compounds. SCR systems utilize a reductant, typically ammonia, to reduce the $NO_x$. Currently available SCR systems can produce high $NO_x$ conversion rates allowing the combustion technologies to focus on power and efficiency. However, currently available SCR systems also suffer from a few drawbacks.

SCR systems generate ammonia to reduce the $NO_x$. When just the proper amount of ammonia is available at the SCR catalyst under the proper conditions, the ammonia is utilized to reduce $NO_x$. However, if the reduction reaction rate is too slow, or if there is excess ammonia in the exhaust, ammonia can slip out the exhaust pipe. Ammonia is an extreme irritant and an undesirable emission. Accordingly, slips of even a few tens of ppm are problematic. Additionally, due to the undesirability of handling pure ammonia, many systems utilize an alternate compound such as urea, that vaporizes and decomposes to ammonia in the exhaust stream. Presently available SCR systems treat injected urea as injected ammonia, and do not account for the vaporization and hydrolysis of urea to component compounds such as ammonia and isocyanic acid. As a result, the urea can decompose to ammonia downstream of the SCR causing ammonia slip, and less ammonia may be available for $NO_x$ reduction than the control mechanism estimates causing higher $NO_x$ emissions at the tailpipe.

SCR systems that utilize urea dosing to generate ammonia depend upon the real-time delivery of urea to the SCR catalyst as engine $NO_x$ emissions emerge. Urea dosers have relatively slow physical dynamics compared to other chemical injectors such as hydrocarbon injectors. Therefore, urea doser dynamics can substantially affect an SCR controls system.

Some currently available SCR systems account for the dynamics of the urea dosing and the generally fast transient nature of the internal combustion engine by utilizing the inherent ammonia storage capacity of many SCR catalyst formulations.

One currently available method introduces a time delay at the beginning of an engine $NO_x$ spike before urea dosing begins (or ramps up), and a time delay after the $NO_x$ spike before urea dosing ends (or ramps down). Ordinarily, an engine $NO_x$ spike will cause a temperature increase in the exhaust gas and SCR catalyst, which may result in the release of stored ammonia on the catalyst. This is especially true when engine power output is used as a substitute for directly estimating engine $NO_x$ emissions. The ammonia release provides ammonia for reducing engine out $NO_x$ while delaying urea injection prevents excess ammonia from slipping out the exhaust. On the $NO_x$ decrease, normally the temperature of the engine exhaust and SCR catalyst decrease, and therefore continued urea injection (the delay before ramping down urea injection) provides ammonia to store on the SCR catalyst and recharge the catalyst.

In many ordinary circumstances, the time delay method causes desirable results in the SCR catalyst. However, in some cases the time delay method can produce undesirable results and even responses that are opposite from an optimal response. For example, a decrease in EGR fraction for any reason causes an engine out $NO_x$ spike with a decrease in exhaust temperature. In a time delay system utilizing engine-out power as a substitute for $NO_x$ emissions, the change will likely be ignored and a standard amount of injected urea will cause an increase in $NO_x$ emissions. In a time delay system that recognizes the engine out $NO_x$ spike, the system delays injecting ammonia-creating urea. Because the temperature on the SCR catalyst is relatively lower, the amount of $NO_x$-reducing ammonia released from the catalyst is reduced, which results in a $NO_x$ emissions increase. At the end of the $NO_x$ spike event, the exhaust temperature increases (from restoration of the designed EGR fraction) while the $NO_x$ emissions decreases. The SCR catalyst ejects ammonia from the reduced storage capacity while the urea injector continues to add ammonia to the system without $NO_x$ available for reduction. Therefore, the system can slip significant amounts of ammonia on the down cycle.

Other currently available systems determine whether the SCR catalyst is at an ammonia storing (adsorption) or ammonia ejecting (desorption) temperature. When the SCR catalyst is storing ammonia, the system injects urea until the catalyst is full. When the SCR catalyst is ejecting ammonia, the system halts injection and allows stored ammonia to release and reduce $NO_x$.

Presently available systems tracking the SCR catalyst temperature suffer from a few drawbacks. For example, the amount of ammonia stored on the SCR catalyst varies with temperature. However, presently available systems assume a storage amount below a specified temperature, and zero storage above the specified temperature. Therefore, the controls may toggle significantly around the specified temperature, significantly overestimate ammonia storage capacity just below the specified temperature, and significantly underestimate ammonia storage capacity just above the specified temperature. Such systems utilize the "normalized stoichiometric ratio" (NSR) to determine baseline urea injection, but do not account for variances in the $NO_x$ composition and $NH_3$ to isocyanic acid ratio of the urea when determining the NSR. Further, such systems do not account for the incomplete vaporization and hydrolysis of urea that occurs in many systems and may therefore not inject sufficient urea to reduce $NO_x$ and/or provide the desired ammonia for storage.

Also, many known SCR systems do not utilize an ammonia oxidation (AMOX) catalyst downstream of the SCR catalyst to convert at least some ammonia slipping from the SCR catalyst to $N_2$ and other less harmful compounds. For those conventional SCR systems that do employ an AMOX catalyst, the operating conditions and conversion capability of the AMOX catalyst are not factored into the reductant dosing rate, ammonia storage control, ammonia slippage control, and $NO_x$ conversion efficiency feedback of such systems.

SUMMARY

The subject matter of the present application has been developed in response to the present state of the art, and in particular, in response to the problems and needs in the art that have not yet been fully solved by currently available exhaust aftertreatment systems. Accordingly, the subject matter of the present application has been developed to provide apparatus, systems, and methods for reducing $NO_x$ emissions using ammonia storage on an SCR catalyst that overcomes at least some shortcomings of the prior art aftertreatment systems.

For example, according to one representative embodiment, an apparatus for reducing $NO_x$ emissions in an engine exhaust includes a $NO_x$ reduction target module that is configured to determine a $NO_x$ reduction requirement. The $NO_x$ reduction requirement includes an amount of $NO_x$ in the exhaust gas stream to be reduced on a selective catalytic reduction (SCR) catalyst that has a catalyst bed. The apparatus also includes an ammonia storage module that is configured to determine an ammonia storage modifier. An ammonia target module of the apparatus is configured to determine an ammonia addition requirement. The ammonia addition requirement includes an amount of ammonia added to the exhaust gas stream to achieve the $NO_x$ reduction requirement. The ammonia target module is communicable in data receiving communication with the ammonia storage module to receive the ammonia storage modifier, which is added to the ammonia addition requirement. The apparatus also includes a reductant target module that is configured to determine a reductant injection requirement. The reductant injection requirement includes an amount of reductant added to the exhaust gas stream to achieve the ammonia addition requirement.

In some implementations, the ammonia storage module is operable to determine an estimated amount of ammonia stored on the SCR catalyst, an estimated amount of ammonia slipping from the SCR catalyst, and an estimated maximum ammonia storage capacity of the SCR catalyst. In these implementations, the ammonia storage modifier can be a function of the estimated amount of ammonia stored on the SCR catalyst, the estimated amount of ammonia slipping from the SCR catalyst, and the estimated maximum ammonia storage capacity of the SCR catalyst.

The estimated amount of ammonia stored on the SCR catalyst can be a function of the rate at which reductant is added to the exhaust gas stream, an estimated temperature of the SCR catalyst bed, the estimated maximum ammonia storage capacity of the SCR catalyst, and whether the SCR catalyst is in an ammonia desorption mode or an ammonia adsorption mode.

In some implementations, the ammonia storage module comprises an ammonia adsorption look-up table and an ammonia desorption look-up table. Each table can include predetermined time constants that correspond to various reductant addition rates and SCR catalyst bed temperatures. The ammonia storage module determines the amount of ammonia stored on the SCR catalyst by utilizing a time constant selected from one of the tables in a first order dynamics equation. The time constant is selected from the ammonia adsorption look-up table when the SCR catalyst is in an ammonia adsorption mode and from the ammonia desorption look-up table when the SCR catalyst is in an ammonia desorption mode.

According to certain implementations, the ammonia storage module is operable to determine an ammonia storage level target. The ammonia storage modifier can be a function of the ammonia storage level target. In specific instances, the ammonia storage modifier can be a positive value if the ammonia storage level target exceeds the current ammonia storage level or a negative value if the current ammonia storage level exceeds the ammonia storage level target. The ammonia storage target module can be configured to interpret the ammonia storage level target by estimating a maximum ammonia storage level and multiplying the maximum ammonia storage level by an ammonia storage level fraction. In certain implementations, the ammonia storage level fraction includes any fraction between 0 and 100 percent inclusive, such as for example, fifty percent, seventy-five percent, ninety percent, and one-hundred percent.

In some implementations, the at least one reductant limiting condition is one or more of an exhaust gas temperature limit, an ammonia slip reductant rate limit, and an SSCR catalyst bed temperature limit.

According to some implementations, the estimated amount of ammonia slipping from the SCR catalyst is a function of a ratio of NO to NO2 in the exhaust gas before and after the SCR catalyst, the amount of $NO_x$ in the exhaust gas before the SCR catalyst, the amount of ammonia in the exhaust gas before the SCR catalyst, the estimated amount of ammonia stored on the SCR catalyst, and the estimated maximum ammonia storage capacity of the SCR catalyst.

According to other implementations, the ammonia storage module can be operable to determine an amount of excess ammonia within the SCR catalyst and an amount of ammonia desorbed within the SCR catalyst. When the estimated amount of ammonia stored on the SCR catalyst is greater than the estimated maximum ammonia storage capacity of the SCR catalyst, the estimated amount of ammonia slipping from the SCR catalyst is approximately equal to the sum of the excess ammonia within the SCR catalyst and the ammonia desorbed from the SCR catalyst.

In some implementations, the ammonia storage module is operable to increase the ammonia storage modifier as the estimated amount of ammonia stored on the SCR catalyst decreases and the estimated amount of ammonia slipping from the SCR catalyst decreases. The ammonia storage module also can be operable to decrease the ammonia storage modifier as the estimated amount of ammonia stored on the SCR catalyst increases and the estimated amount of ammonia slipping from the SCR catalyst increases.

According to another embodiment, a method for reducing $NO_x$ emissions in an engine exhaust includes determining a $NO_x$ reduction requirement comprising an amount of $NO_x$ in the exhaust gas stream to be reduced on a selected catalytic reduction (SCR) catalyst having a catalyst bed. The method also includes determining an ammonia addition requirement. The ammonia addition requirement includes an amount of ammonia added to the exhaust gas stream to achieve the $NO_x$ reduction requirement. Additionally, the method includes determining an ammonia storage modifier, an estimated amount of ammonia stored on the SCR catalyst, an estimated amount of ammonia slipping from the SCR catalyst, and an estimated maximum ammonia storage capacity of the SCR catalyst. The ammonia storage modifier can be based at least partially on the estimated amount of ammonia stored on the SCR catalyst, the estimated amount of ammonia slipping from the SCR catalyst, and the estimated maximum ammonia storage capacity of the SCR catalyst. Additionally, the method includes adding the ammonia storage modifier to the ammonia addition requirement. The method further includes determining a reductant injection requirement. The reductant injection requirement can include an amount of reductant added to the exhaust gas stream to achieve the ammonia addition requirement.

According to some implementations, determining the estimated amount of ammonia stored on the SCR catalyst can include determining the rate at which reductant is added to the exhaust gas stream and the temperature of the SCR catalyst bed. Determining the estimated amount of ammonia stored on the SCR catalyst also can include calculating the estimated amount of ammonia stored on the SCR catalyst based at least partially on the rate at which reductant is added to the exhaust stream, the temperature of the SCR catalyst bed, and the maximum ammonia storage capacity of the SCR catalyst.

In other implementations, determining the estimated amount of ammonia stored on the SCR catalyst can include selecting a time constant from one of an ammonia adsorption look-up table and an ammonia desorption look-up table. Determining the estimated amount of ammonia stored on the SCR catalyst also can include utilizing the selected time constant in a first order dynamics equation. In certain instances, the time constant is selected from the ammonia adsorption look-up table when ammonia is adsorbing on the SCR catalyst bed and the time constant is selected from the ammonia desorption look-up table when ammonia is desorbing from the SCR catalyst bed.

In some implementations, the method includes determining an ammonia storage level target. Correspondingly, the ammonia storage modifier can be a positive value if the ammonia storage level target exceeds the current ammonia storage level and the ammonia storage modifier can be a negative value if the current ammonia storage level exceeds the ammonia storage level target. In some instances, determining the ammonia storage level target can include multiplying the maximum ammonia storage level by an ammonia storage level fraction. The ammonia storage level fraction can include any fraction between 0 and 100 percent inclusive, such as for example, fifty percent, seventy-five percent, ninety percent, and one-hundred percent. In some instances, the maximum ammonia storage level can be a function of an SCR catalyst bed temperature.

In some representative implementations, determining the estimated amount of ammonia slipping from the SCR catalyst includes first determining a ratio of NO to $NO_2$ in the exhaust gas before and after the SCR catalyst, the amount of $NO_x$ in the exhaust gas before the SCR catalyst, and the amount of ammonia in the exhaust gas before the SCR catalyst. Then, determining the estimated amount of ammonia slipping from the SCR catalyst includes calculating the estimated amount of ammonia slipping from the SCR catalyst based at least partially on the ratio of NO to NO2 in the exhaust gas before and after the SCR catalyst, the amount of $NO_x$ in the exhaust gas before the SCR catalyst, the amount of ammonia in the exhaust gas before the SCR catalyst, the estimated amount of ammonia stored on the SCR catalyst, and the estimated maximum ammonia storage capacity of the SCR catalyst.

In other representative implementations, the method can include determining an amount of excess ammonia within the SCR catalyst and an amount of ammonia desorbed within the SCR catalyst. When the estimated amount of ammonia stored on the SCR catalyst is greater than the estimated maximum ammonia storage capacity of the SCR catalyst, determining the estimated amount of ammonia slipping from the SCR catalyst comprises adding together the amount of excess ammonia within the SCR catalyst and the amount of ammonia desorbed within the SCR catalyst.

In one exemplary implementation, determining the ammonia storage modifier includes increasing the ammonia storage modifier as the estimated amount of ammonia stored on the SCR catalyst decreases and the estimated amount of ammonia slipping from the SCR catalyst decreases. Similarly, determining the ammonia storage modifier can include decreasing the ammonia storage modifier as the estimated amount of ammonia stored on the SCR catalyst increases and the estimated amount of ammonia slipping from the SCR catalyst increases.

According to another embodiment, a system for reducing $NO_x$ emissions in an engine exhaust gas stream includes an internal combustion engine producing an exhaust gas stream, a selective catalytic reduction (SCR) catalyst that reduces $NO_x$ emissions in the exhaust gas stream in the presence of a reductant, a reductant injector that injects reductant into the exhaust gas stream upstream of the SCR catalyst, and a controller.

The controller includes a $NO_x$ reduction target module, an ammonia storage module, an ammonia target module, and a reductant target module. The $NO_x$ reduction target module can be operable to determine a $NO_x$ reduction requirement that includes an amount of $NO_x$ in the exhaust gas stream to be reduced on the SCR catalyst. The ammonia storage module can be operable to determine an ammonia storage modifier. The ammonia target module can be operable to determine an ammonia addition requirement that includes an amount of ammonia added to the exhaust gas stream to achieve the $NO_x$ reduction requirement. The ammonia target module is communicable in data receiving communication with the ammonia storage module to receive the ammonia storage modifier. Further, the ammonia target module is operable to add the ammonia storage modifier to the ammonia addition requirement. The reductant target module can be operable to determine a reductant injection requirement that includes an amount of reductant added to the exhaust gas stream to achieve the ammonia addition requirement.

According to some implementations, the ammonia storage module is operable to determine an estimated amount of ammonia stored on the SCR catalyst, an estimated amount of ammonia slipping from the SCR catalyst, and an estimated maximum ammonia storage capacity of the SCR catalyst. Correspondingly, the ammonia storage modifier can be a function of the estimated amount of ammonia stored on the SCR catalyst, the estimated amount of ammonia slipping from the SCR catalyst, and the estimated maximum ammonia storage capacity of the SCR catalyst.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Furthermore, the described features, advantages, and characteristics of the subject matter of the present disclosure may be combined in any suitable manner in one or more embodiments. One skilled in the relevant art will recognize that the subject matter may be practiced without one or more of the specific features or advantages of a particular embodiment. In other instances, additional features and advantages may be recognized in certain embodiments that may not be present in all embodiments. These features and advantages will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Figure 1:
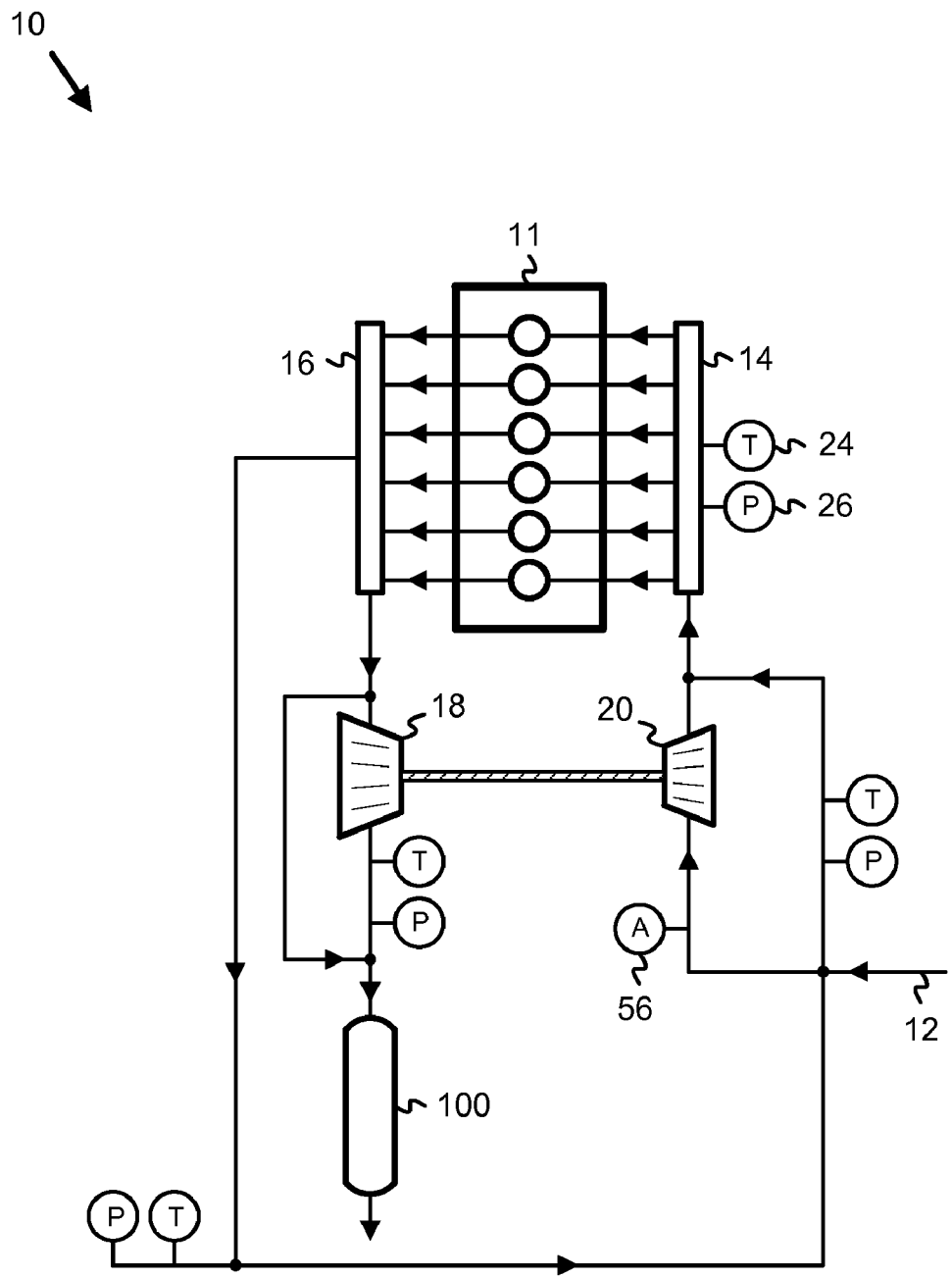
FIG. 1 is a schematic block diagram of an internal combustion engine having an exhaust after-treatment system according to one representative embodiment.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the subject matter described herein may be combined in any suitable manner in one or more embodiments. In the following description, numerous specific details are provided, such as examples of controls, structures, algorithms, programming, software modules, user selections, network transactions, database queries, database structures, hardware modules, hardware circuits, hardware chips, etc., to provide a thorough understanding of embodiments of the subject matter. One skilled in the relevant art will recognize, however, that the subject matter may be practiced without one or more of the specific details, or with other methods, components, materials, and so forth. In other instances, well-known structures, materials, or operations are not shown or described in detail to avoid obscuring aspects of the disclosed subject matter.

Internal Combustion Engine System

FIG. 1 depicts one embodiment of an internal combustion engine system 10. The main components of the engine system 10 include an internal combustion engine 11 and an exhaust gas after-treatment system 100 coupled to the engine. The internal combustion engine 11 can be a compression ignited internal combustion engine, such as a diesel fueled engine, or a spark-ignited internal combustion engine, such as a gasoline fueled engine operated lean. The engine system 10 further includes an air inlet 12, intake manifold 14, exhaust manifold 16, turbocharger turbine 18, turbocharger compressor 20, temperature sensors (e.g., temperature sensor 24), pressure sensors (e.g., pressure sensor 26), and air-flow sensor 56. The air inlet 12 is vented to the atmosphere and connected to an inlet of the intake manifold 14 to enable air to enter the intake manifold. The intake manifold 14 includes an outlet operatively coupled to compression chambers of the internal combustion engine 11 for introducing air into the compression chambers.

Within the internal combustion engine 11, the air from the atmosphere is combined with fuel to power the engine. Combustion of the fuel and air produces exhaust gas that is operatively vented to the exhaust manifold 16. From the exhaust manifold 16, a portion of the exhaust gas may be used to power the turbocharger turbine 18. The turbine 18 drives the turbocharger compressor 20, which may compress at least some of the air entering the air inlet 12 before directing it to the intake manifold 14 and into the compression chambers of the engine 11.

The exhaust gas after-treatment system 100 is coupled to the exhaust manifold 16 of the engine 11. At least a portion of the exhaust gas exiting the exhaust manifold 16 can pass through the exhaust after-treatment system 100. In certain implementations, the engine system 10 includes an exhaust gas recirculation (EGR) valve (not shown) configured to open to allow a portion of the exhaust gas to recirculate back into the compression chambers for altering the combustion properties of the engine 11.

Figure 2:
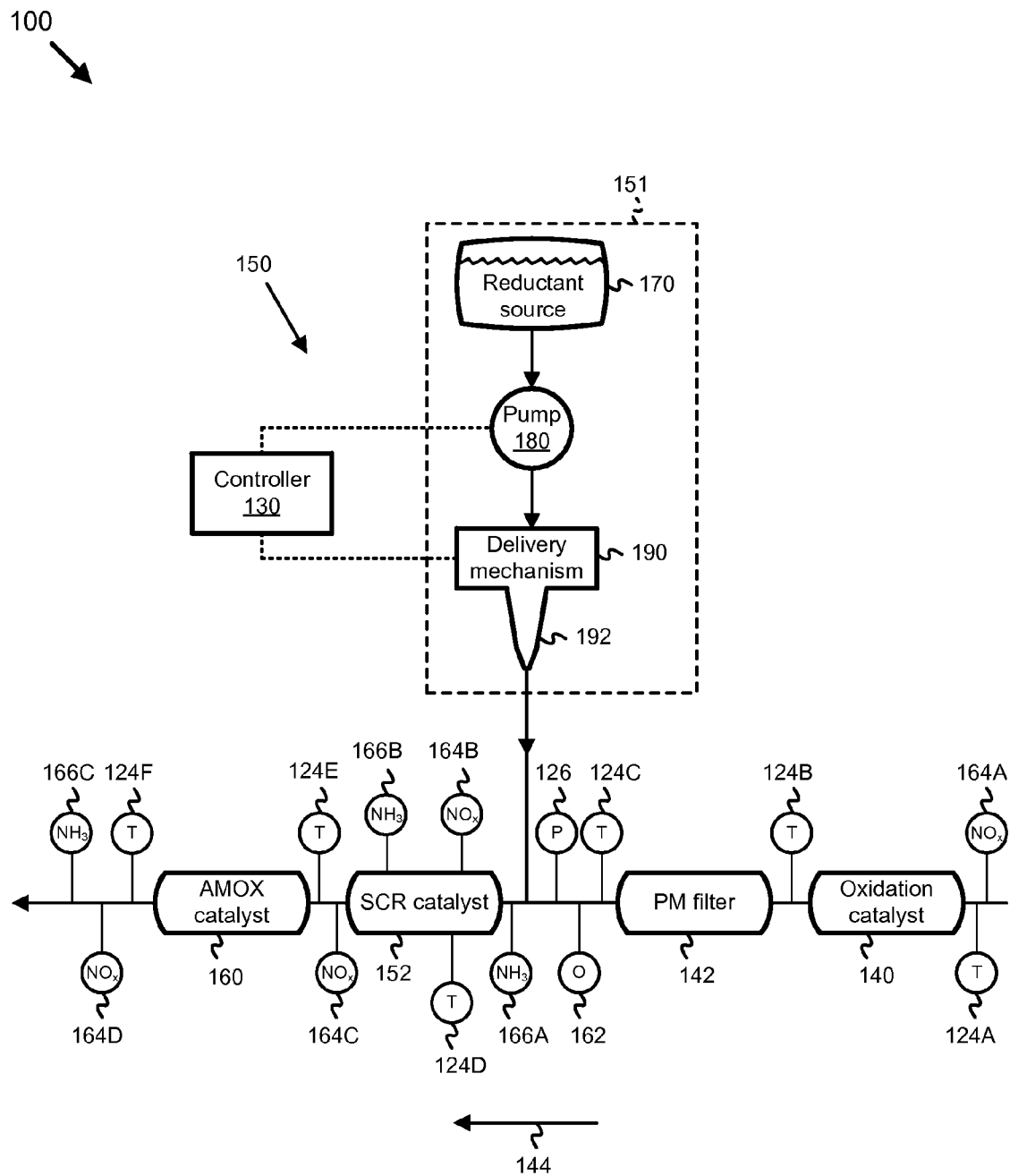
FIG. 2 is a schematic block diagram of the exhaust after-treatment system of FIG. 1 according to one representative embodiment.

Generally, the exhaust gas after-treatment system 100 is configured to remove various chemical compound and particulate emissions present in the exhaust gas received from the exhaust manifold 16 and not recirculated back into the engine 11. As illustrated in FIG. 2, the exhaust gas after-treatment system 100 includes controller 130, oxidation catalyst 140, particulate matter (PM) filter 142, SCR system 150 having an SCR catalyst 152, and ammonia oxidation (AMOX) catalyst 160. In an exhaust flow direction, indicated by directional arrow 144, exhaust may flow from the exhaust manifold 16, through the oxidation catalyst 140, through the particulate filter 142, through the SCR catalyst 152, through the AMOX catalyst 160, and then be expelled into the atmosphere. In other words, the particulate filter 142 is positioned downstream of the oxidation catalyst 140, the SCR catalyst 152 is positioned downstream of the particulate filter 142, and the AMOX catalyst 160 is positioned downstream of the SCR catalyst 152. Generally, exhaust gas treated in the exhaust gas after-treatment system 100 and released into the atmosphere consequently contains significantly fewer pollutants, such as diesel particulate matter, $NO_x$, hydrocarbons, such as carbon monoxide and carbon dioxide, than untreated exhaust gas.

The oxidation catalyst 140 can be any of various flow-through, diesel oxidation catalysts (DOC) known in the art. Generally, the oxidation catalyst 140 is configured to oxidize at least some particulate matter, e.g., the soluble organic fraction of soot, in the exhaust and reduce unburned hydrocarbons and CO in the exhaust to less environmentally harmful compounds. For example, the oxidation catalyst 140 may sufficiently reduce the hydrocarbon and CO concentrations in the exhaust to meet the requisite emissions standards.

The particulate filter 142 can be any of various particulate filters known in the art configured to reduce particulate matter concentrations, e.g., soot and ash, in the exhaust gas to meet requisite emission standards. The particulate filter 142 can be electrically coupled to a controller, such as controller 130, that controls various characteristics of the particulate filter, such as, for example, the timing and duration of filter regeneration events. In some implementations, the particulate filter 142 and associated control system is similar to, or the same as, the respective particulate filters and control systems described in U.S. patent application Ser. Nos. 11/227,320; 11/227,403; 11/227,857; and 11/301,998, which are incorporated herein by reference.

The SCR system 150 includes a reductant delivery system 151 that includes a reductant source 170, pump 180 and delivery mechanism 190. The reductant source 170 can be a container or tank capable of retaining a reductant, such as, for example, ammonia ($NH_3$), urea, diesel fuel, or diesel oil. The reductant source 170 is in reductant supplying communication with the pump 180, which is configured to pump reductant from the reductant source to the delivery mechanism 190. The delivery mechanism 190 can include a reductant injector schematically shown at 192 positioned upstream of the SCR catalyst 152. The injector is selectively controllable to inject reductant directly into the exhaust gas stream prior to entering the SCR catalyst 152. In some embodiments, the reductant can either be ammonia or urea, which decomposes to produce ammonia. As will be described in more detail below, in these embodiments, the ammonia reacts with $NO_x$ in the presence of the SCR catalyst 152 to reduce the $NO_x$ to less harmful emissions, such as $N_2$ and $H_2O$. The SCR catalyst 152 can be any of various catalysts known in the art. For example, in some implementations, the SCR catalyst 152 is a vanadium-based catalyst, and in other implementations, the SCR catalyst is a zeolite-based catalyst, such as a Cu-Zeolite or a Fe-Zeolite catalyst. In one representative embodiment, the reductant is aqueous urea and the SCR catalyst 152 is a zeolite-based catalyst.

The AMOX catalyst 160 can be any of various flow-through catalysts configured to react with ammonia to produce mainly nitrogen. Generally, the AMOX catalyst 160 is utilized to remove ammonia that has slipped through or exited the SCR catalyst 152 without reacting with $NO_x$ in the exhaust. In certain instances, the system 10 can be operable with or without an AMOX catalyst. Further, although the AMOX catalyst 160 is shown as a separate unit from the SCR catalyst 152, in some implementations, the AMOX catalyst can be integrated with the SCR catalyst, e.g., the AMOX catalyst and the SCR catalyst can be located within the same housing.

The exhaust after-treatment system 100 includes various sensors, such as temperature sensors 124A-F, pressure sensor 126, oxygen sensor 162, $NO_x$ sensors 164A-D, $NH_3$ sensors 166A-C, dual ammonia/$NO_x$ sensors (not shown) and the like, that are disposed throughout the exhaust gas after-treatment system. The various sensors may be in electrical communication with the controller 130 to monitor operating conditions and control the engine system 10, including the exhaust after-treatment system 100. In the illustrated embodiment, the exhaust gas after-treatment system 100 includes $NO_x$ sensor 164A upstream of the oxidation catalyst 140, $NO_x$ sensor 164B embedded within the SCR catalyst 152, $NO_x$ sensor 164C intermediate the SCR catalyst and AMOX catalyst 160, and $NO_x$ sensor 164D downstream of the AMOX catalyst. Further, the illustrated exhaust gas after-treatment system 100 includes $NH_3$ sensor 166A upstream of the SCR catalyst 125, $NH_3$ sensor 166B embedded within the SCR catalyst 152, and $NH_3$ sensor 166C downstream of the AMOX catalyst 160.

Although the exhaust after-treatment system 100 shown includes one of an oxidation catalyst 140, particulate filter 142, SCR catalyst 152, and AMOX catalyst 160 positioned in specific locations relative to each other along the exhaust flow path, in other embodiments, the exhaust after-treatment system may include more than one of any of the various catalysts positioned in any of various positions relative to each other along the exhaust flow path as desired. Further, although the oxidation catalyst 140 and AMOX catalyst 160 are non-selective catalysts, in some embodiments, the oxidation and AMOX catalysts can be selective catalysts.

The controller 130 controls the operation of the engine system 10 and associated sub-systems, such as the engine 11 and exhaust gas after-treatment system 100. The controller 130 is depicted in FIG. 2 as a single physical unit, but can include two or more physically separated units or components in some embodiments if desired. Generally, the controller 130 receives multiple inputs, processes the inputs, and transmits multiple outputs. The multiple inputs may include sensed measurements from the sensors and various user inputs. The inputs are processed by the controller 130 using various algorithms, stored data, and other inputs to update the stored data and/or generate output values. The generated output values and/or commands are transmitted to other components of the controller and/or to one or more elements of the engine system 10 to control the system to achieve desired results, and more specifically, achieve desired exhaust gas emissions.

The controller 130 includes various modules for controlling the operation of the engine system 10. For example, the controller 130 includes one or more modules for controlling the operation of the particulate filter 142 as described above. The controller 130 also includes one or more modules for controlling the operation of the SCR system 150. The controller 130 further includes one or more modules for controlling the operation of the engine 11. Additionally, in the event the oxidation catalyst 140 and AMOX catalyst 160 are selectively controllable, the controller 130 can include one or more modules for controlling the operation of the respective oxidation and AMOX catalysts.

Figure 3:
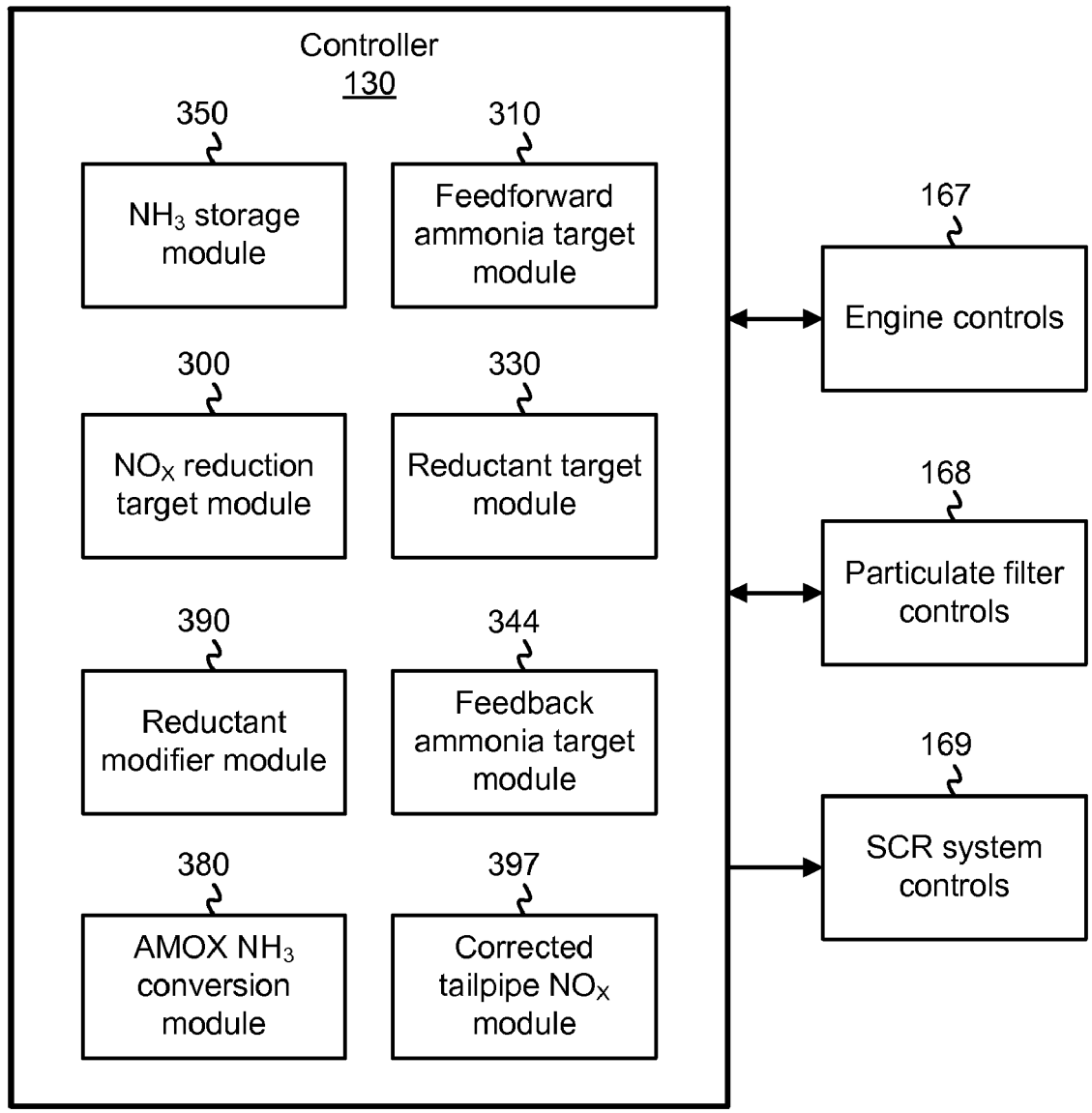
FIG. 3 is a schematic block diagram of a controller of the exhaust after-treatment system of FIG. 2 according to one representative embodiment.

Referring to FIG. 3, and according to one embodiment, the controller 130 includes several modules for controlling operation of the SCR system 150 to provide efficient reduction of $NO_x$ during transient and steady state operations, while reducing ammonia slip from the tailpipe. More specifically, the controller 130 includes a $NO_x$ reduction target module 300, at least one ammonia target module (e.g., feedforward ammonia target module 310 and feedback ammonia target module 344) a reductant target module 330, an $NH_3$ storage module 350, an AMOX $NH_3$ conversion module 380, a reductant limiting module 390, and a corrected tailpipe $NO_x$ module 397. Generally, the modules are independently and/or cooperatively operated to achieve optimal $NO_x$ conversion efficiency on the SCR catalyst 152 while minimizing ammonia slip and urea consumption. The controller 130 is communicable in data receiving and/or transmitting communication with several sub-systems of the engine system 10, such as engine controls 167, PM filter system controls 168, and SCR system controls 169.

$NO_x$ Reduction Target Module

Figure 4:
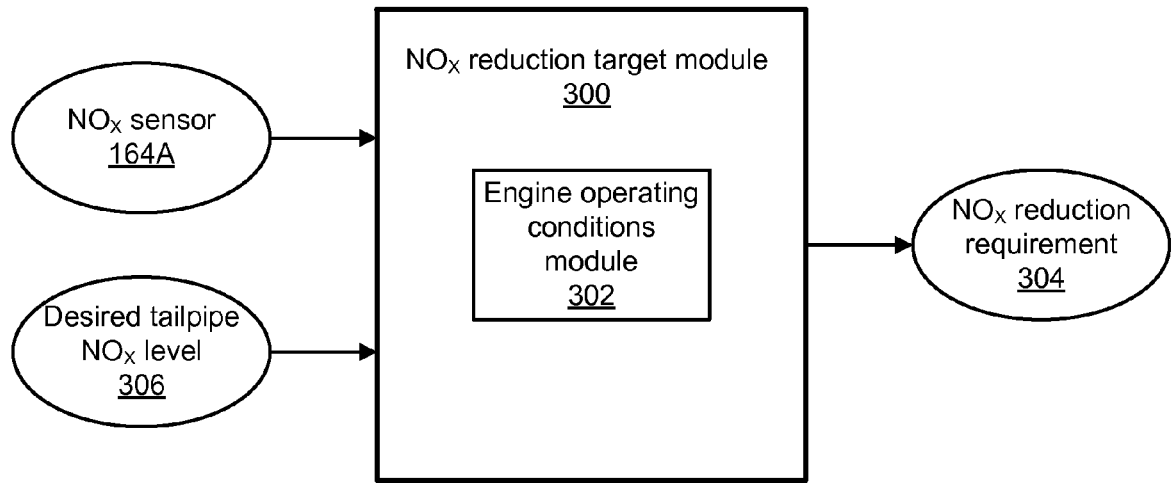
FIG. 4 is a schematic block diagram of a $NO_x$ reduction target module of the controller of FIG. 3 according to one representative embodiment.

Referring to FIG. 4, the $NO_x$ reduction target module 300 is operable to determine a $NO_x$ reduction requirement 304. The $NO_x$ reduction requirement represents the amount of $NO_x$ that should be reduced from the exhaust gas stream on the SCR catalyst 152 to achieve a predetermined exhaust gas emissions limit. In other words, the $NO_x$ reduction target module 300 determines the $NO_x$ reduction requirement 304 necessary to achieve the desired tailpipe $NO_x$ level 306. The desired amount of $NO_x$ at the tailpipe, e.g., desired tailpipe $NO_x$ level 306 (see FIGS. 4 and 16), is representative of the amount of $NO_x$ allowed to exit the tailpipe pursuant to regulated emissions standards.

Generally, the $NO_x$ reduction requirement 304 is expressed as the fraction of the $NO_x$ in the exhaust gas stream to be reduced. The $NO_x$ reduction requirement can also be expressed in terms of a $NO_x$ reduction rate or the rate at which $NO_x$ should be reduced to achieve the predetermined exhaust gas emissions limit. In certain implementations, the $NO_x$ reduction target module 300 is communicable in data receiving communication with the $NO_x$ sensor 164A to determine the amount of $NO_x$ present in the exhaust gas stream prior to entering the SCR catalyst 152. Alternatively, or additionally, in some implementations, the amount of $NO_x$ present in the exhaust gas stream can be estimated via operation of an engine operating conditions module 302. The engine operating conditions module 302 compares the operating conditions of the engine 11 against a stored operating map containing predetermined exhaust $NO_x$ levels for various operating conditions of the engine to determine an estimated amount of $NO_x$ in the exhaust gas stream. The $NO_x$ reduction target module 300 compares the actual or estimated amount of $NO_x$ in the exhaust gas stream at the engine outlet to a desired level of $NO_x$ 306 in the exhaust gas emitted from the tailpipe to determine the $NO_x$ reduction requirement 304.

Ammonia Target Modules

The controller 130 includes an ammonia target module operable to determine an ammonia addition requirement. As defined herein, the ammonia addition requirement is the amount of ammonia that should be added to the exhaust gas stream to reduce the $NO_x$ in the exhaust gas stream to the desired level for meeting the emissions standards. In certain embodiments, the controller 130 includes the feedforward ammonia target module 310 for determining an ammonia addition requirement 326 using a feedforward methodology (see FIG. 5A). In other embodiments, the controller 130 includes the feedback ammonia target module 344 for determining an ammonia addition requirement 348 using a feedback methodology (see FIG. 5B). In yet some embodiments, the controller 130 includes both the feedforward ammonia target module 310 and the feedback ammonia target module 344.

Figure 5A:
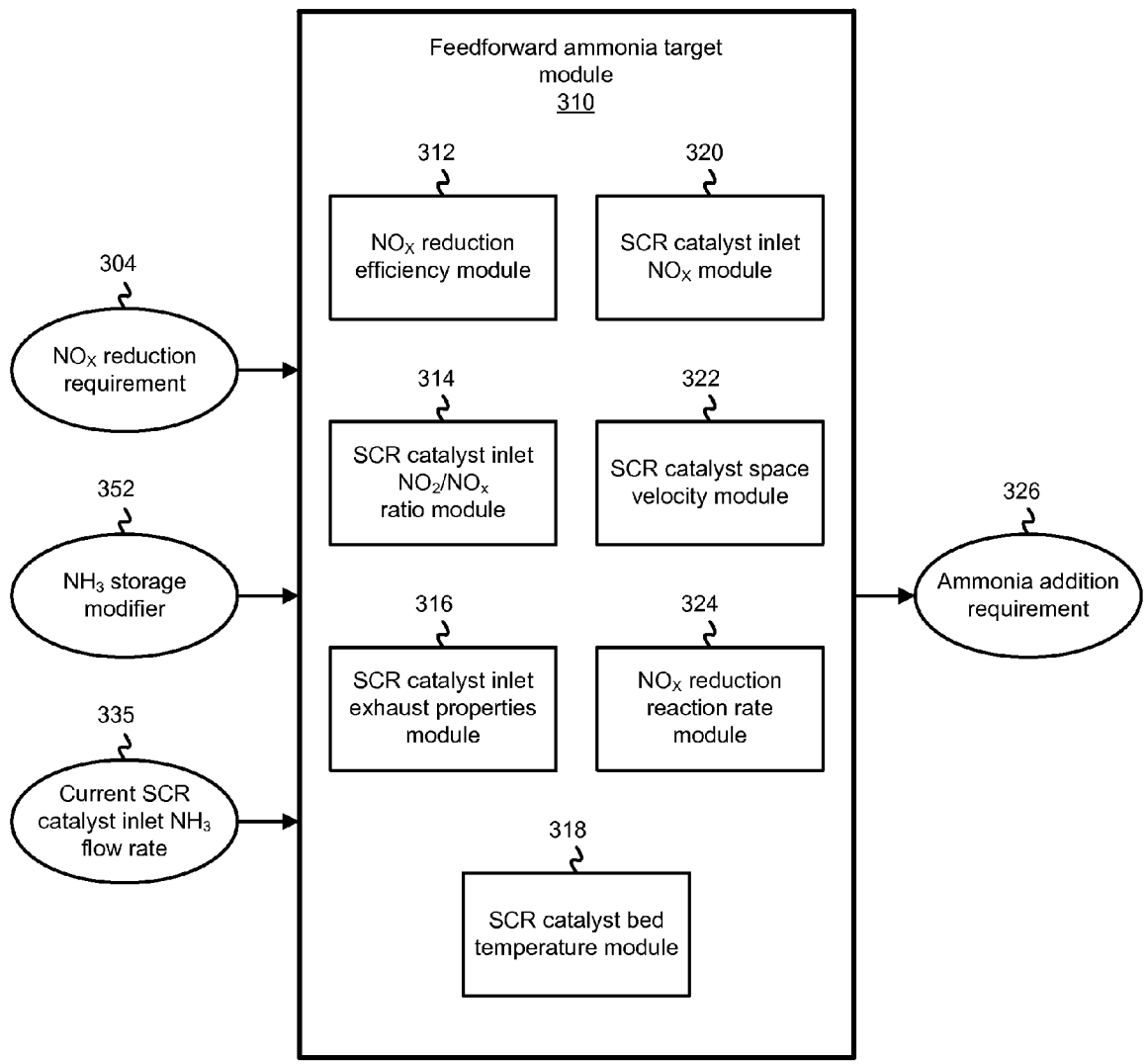
FIG. 5A is a schematic block diagram of a feedforward ammonia target module of the controller of FIG. 3 according to one representative embodiment.
Figure 7:
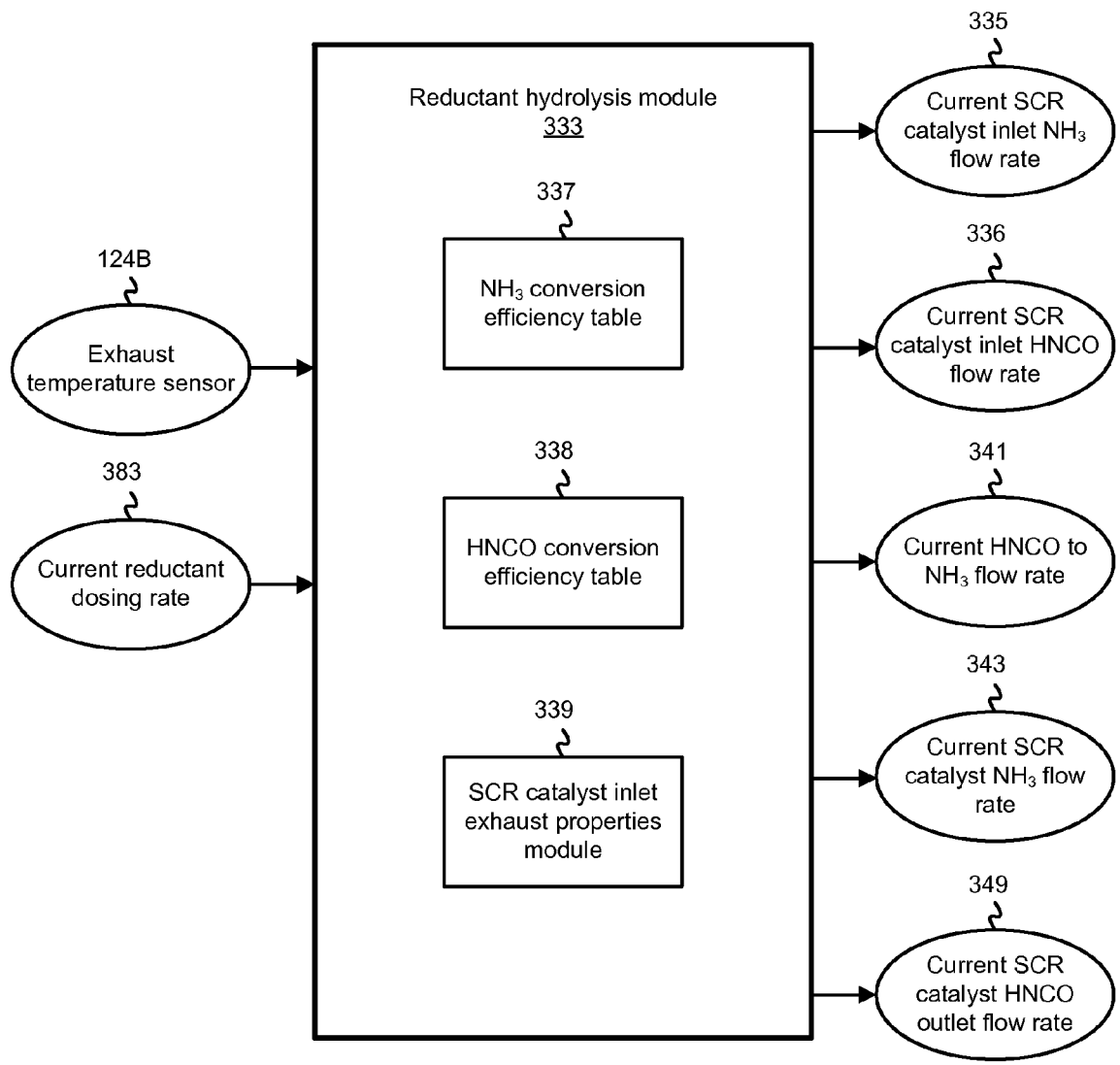
FIG. 7 is a schematic block diagram of a reductant hydrolysis module of the reductant target module of FIG. 6 according to one representative embodiment.

Referring first to FIG. 5A, the feedforward ammonia target module 310 receives as input the $NO_x$ reduction requirement 304 from the $NO_x$ reduction target module 311 (see FIG. 4), an $NH_3$ storage modifier 352 from the $NH_3$ storage module 350 (see FIG. 10), and a current SCR catalyst inlet $NH_3$ flow rate 335 from the reductant hydrolysis module 333 (see FIG. 7) and utilized by the module 310 to determine the ammonia addition requirement 326. In the representative illustrated embodiment, the feedforward ammonia target module 310 includes a $NO_x$ reduction efficiency module 312, an SCR catalyst inlet $NO_2/NO_x$ ratio module 314, an SCR catalyst inlet exhaust properties module 316, an SCR catalyst bed temperature module 318, an SCR catalyst inlet $NO_x$ module 320, an SCR catalyst space velocity module 322, and a $NO_x$ reduction reaction rate module 324.

The $NO_x$ reduction efficiency module 312 is operable to determine the maximum efficiency of $NO_x$ reduction on the SCR catalyst 152. Generally, the $NO_x$ reduction efficiency module 312 considers a desired $NO_x$ conversion efficiency and the condition of the SCR catalyst.

The desired $NO_x$ conversion efficiency can be any of various efficiencies and be dependent on the difference between the amount of $NO_x$ in the exhaust gas stream at the engine outlet with the desired amount of $NO_x$ in the exhaust gas stream at the tailpipe outlet. For example, in some implementations, the desired $NO_x$ conversion efficiency of the SCR catalyst 152 can be the efficiency necessary for achieving the desired tailpipe $NO_x$ level 306 at the SCR catalyst outlet. However, in embodiments having an AMOX catalyst, the desired $NO_x$ conversion efficiency of the SCR catalyst 152 can be lower than if no AMOX catalyst is being used because the AMOX catalyst can reduce ammonia slipping from the SCR catalyst.

The condition of the SCR catalyst 152 affects the efficiency of the SCR catalyst. The more degraded the condition of the SCR catalyst, the lower the maximum efficiency of $NO_x$ reduction on the SCR catalyst 152. Accordingly, the $NO_x$ reduction efficiency module 312 is operable to compare the desired $NO_x$ conversion efficiency with the maximum $NO_x$ conversion efficiency of the SCR catalyst 152 and output the smaller of the two efficiencies to the feedforward ammonia target module 310. The feedforward ammonia target module 310 then utilizes the smaller of the desired and maximum $NO_x$ conversion efficiencies determined by the $NO_x$ reduction efficiency module 312 to determine the ammonia addition requirement 326. Generally, the lower the smaller $NO_x$ conversion efficiency, the lower the ammonia addition requirement 326.

The $NO_x$ reduction efficiency module 312 can determine the maximum $NO_x$ conversion efficiency of the SCR catalyst 152 in various ways, such as described in pending U.S. patent application Ser. No. 12/632,646 entitled "APPARATUS, SYSTEM, AND METHOD FOR ESTIMATING A MAXIMUM $NH_3$ CONVERSION CAPABILITY OF A SELECTIVE CATALYTIC REDUCTION CATALYST," which is incorporated herein by reference. Moreover, the condition of the SCR catalyst 152 can be indicated by an SCR catalyst degradation factor. The SCR catalyst degradation factor can be determined by an SCR catalyst degradation factor module, such as module 368 described below in relation to FIG. 11, according to any of various ways. For example, the SCR catalyst degradation factor module can determine the SCR catalyst degradation factor in a manner similar to that described in U.S. Pat. No. 8,141,340, entitled "APPARATUS, SYSTEM, AND METHOD FOR DETERMINING A DEGRADATION OF A SELECTIVE CATALYTIC REDUCTION CATALYST," which is incorporated herein by reference.

The SCR catalyst inlet $NO_2/NO_x$ ratio module 314 is operable to predict the $NO_2/NO_x$ ratio of the exhaust gas in the exhaust gas stream at the inlet of the SCR catalyst 152. In some implementations, the $NO_2/NO_x$ ratio is expressed as the following ratio:

$$\frac{NO_2}{NO + NO_2} \qquad (1)$$

where NO is the mass concentration of nitrogen monoxide in a predetermined volume of exhaust gas and $NO_2$ is the mass concentration of nitrogen dioxide in the predetermined volume of exhaust gas.

The SCR catalyst inlet exhaust properties module 316 is operable to determine various properties of the exhaust gas at the inlet of the SCR catalyst 152. The properties can include, for example, the mass flow rate of the exhaust and the temperature of the exhaust. In some implementations, the exhaust gas properties are predicted based on predetermined exhaust property values for predetermined operating conditions of the engine system 10. For example, the SCR catalyst inlet exhaust properties module 316 can include an exhaust properties map, table or vector comparing predetermined exhaust property values with engine system operating conditions, such as the operating load and/or speed of the engine 11. In certain implementations, the SCR catalyst inlet exhaust properties module 316 determines the exhaust gas properties by processing input from any of various sensors known in the art, such as mass flow and temperatures sensors.

The SCR catalyst bed temperature module 318 is operable to determine the bed temperature of the SCR catalyst 152. The bed temperature of the SCR catalyst 152 can be determined based on one or more temperature sensors embedded in the SCR catalyst, such as temperature sensor 124D, or predicted by a module (see, e.g., AMOX catalyst bed temperature module 386 of FIG. 13) that uses various operating parameters of the system, such as the exhaust gas mass flow rate and temperature before and after the SCR catalyst 152. Accordingly, although the illustrated embodiments use an SCR catalyst bed temperature sensor 124D for determining the temperature of the SCR catalyst bed, in other embodiments, the sensor is replaced or supplemented with an SCR catalyst bed temperature module operable to predict or estimate the temperature of the SCR catalyst bed.

The SCR catalyst inlet $NO_x$ module 320 is operable to determine the concentration of $NO_x$ in the exhaust gas at the inlet of the SCR catalyst 152. The $NO_x$ concentration can be predicted based on predetermined exhaust conditions corresponding to predetermined operating conditions of the engine system 10. For example, the module 320 can access an exhaust properties map, table or vector such as described above to estimate the $NO_x$ concentration in the exhaust. Alternatively, or additionally, the concentration of $NO_x$ in the exhaust gas upon entering the SCR catalyst 152 can be measured using the first $NO_x$ sensor 164A positioned upstream of the SCR catalyst.

The SCR catalyst space velocity module 322 is operable to determine the space velocity of the SCR catalyst 152. Generally, the space velocity of the SCR catalyst 152 represents the amount of $NO_x$ in the exhaust gas stream that is reactable within the SCR catalyst over a given time. Accordingly, the space velocity of the SCR catalyst 152 typically is represented in terms of per unit time, e.g., 1/hour, 1,000/hour, etc. The space velocity of the SCR catalyst 152 is based on various exhaust gas and catalyst conditions. For example, the space velocity can be based at least partially on the volume and/or reaction, or bed, surface area of the SCR catalyst, and the density, viscosity and/or flow rate of the exhaust gas. In some implementations, the SCR catalyst space velocity module 322 determines the space velocity of the SCR catalyst 152 by receiving inputs concerning operating conditions of the engine system 10, and, based on the operation conditions, obtaining the space velocity of the SCR for the given conditions by accessing a table or map stored on the module. The table can include various predetermined space velocities obtained via experimental testing and calibration for a given SCR catalyst operating under the various operating conditions achievable by the engine system 10.

The $NO_x$ reduction reaction rate module 324 is operable to predict the rate at which ammonia reacts with and reduces $NO_x$ on the SCR catalyst 152. The predicted $NO_x$ reaction rate is at least partially dependent on the $NO_x$ composition or concentration of the exhaust gas and the frequency of the various types of $NO_x$ reduction reactions occurring on the SCR catalyst 152. Generally, $NO_x$ is reduced by ammonia in one of the following three most active stoichiometric chemical reactions:

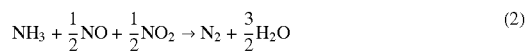

$$NH_3 + \frac{1}{2}NO + \frac{1}{2}NO_2 \rightarrow N_2 + \frac{3}{2}H_2O \qquad (2)$$

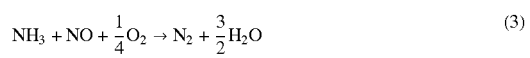

$$NH_3 + NO + \frac{1}{4}O_2 \rightarrow N_2 + \frac{3}{2}H_2O \qquad (3)$$

$$NH_3 + \frac{3}{4}NO_2 \rightarrow \frac{7}{8}N_2 + \frac{3}{2}H_2O \qquad (4)$$

The predicted $NO_x$ reaction rate is also at least partially dependent on the ammonia concentration rate, the bed temperature of the SCR catalyst 152, and the space velocity of the SCR catalyst. Further, in some implementations, the predicted $NO_x$ reaction rate is also at least partially dependent on the degradation factor or condition of the SCR catalyst 152. The predicted $NO_x$ reaction rate can be expressed as the sum of a predicted $NO_x$ reaction rate for reducing NO according to Equations 2 and 3 above and a predicted $NO_x$ reaction rate for reducing $NO_2$ according to Equations 3 and 4 above.

Based at least partially on the desired $NO_x$ conversion efficiency, the $NO_2/NO_x$ ratio of the exhaust gas, the exhaust flow rate, the temperature and condition of the SCR catalyst 152 bed, the amount of $NO_x$ and $NH_3$ at the inlet of the SCR catalyst, and the $NO_x$ reduction reaction rate, the ammonia target module determines the ammonia addition requirement 326. In some embodiments, the ammonia addition requirement 326 is also at least partially based on an $NH_3$ storage modifier 352 determined by an $NH_3$ storage module 350 as will be described in more detail below (see FIG. 7).

Figure 5B:
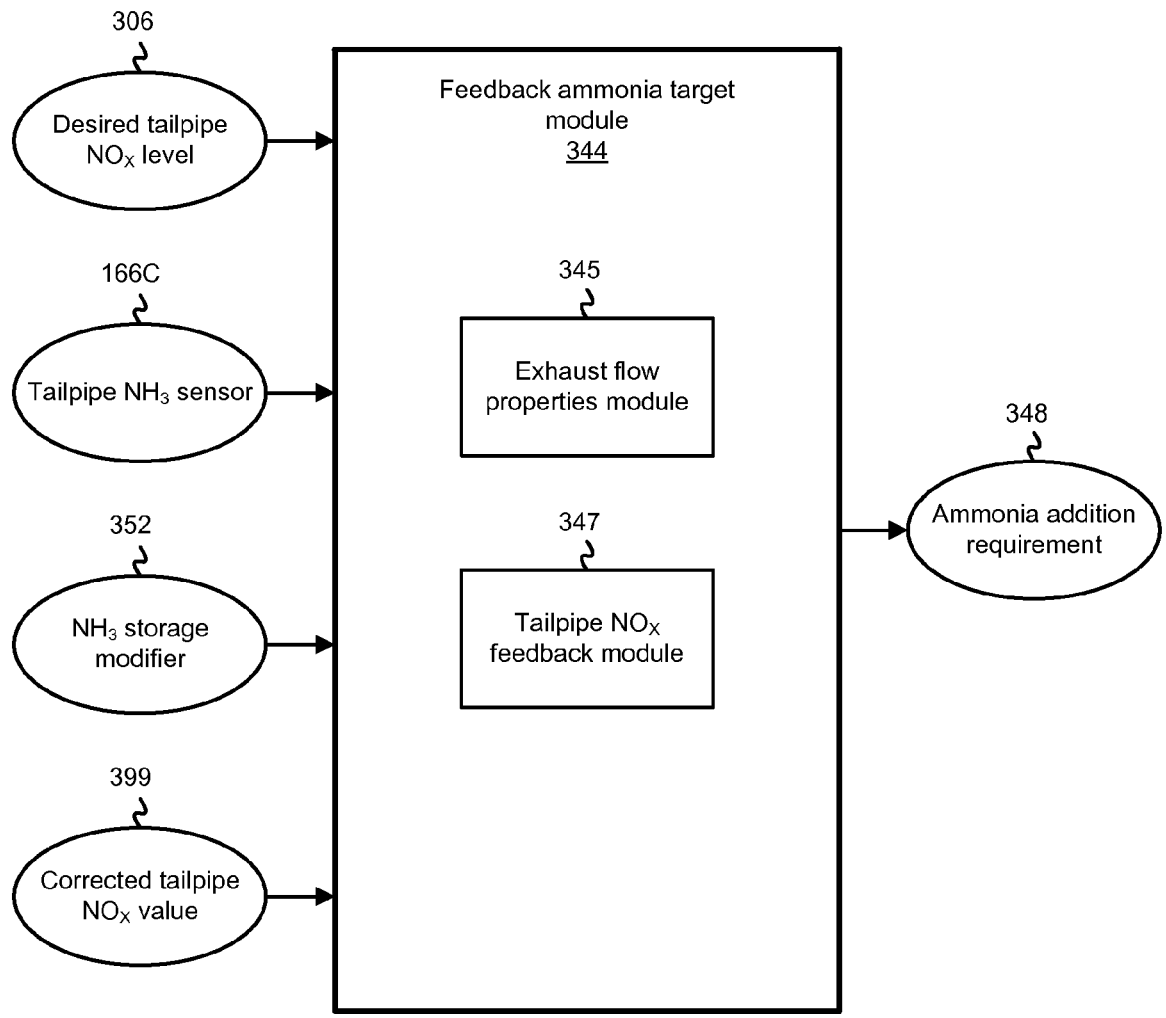
FIG. 5B is a schematic block diagram of a feedback ammonia target module of the controller of FIG. 3 according to one representative embodiment.

According to another embodiment shown in FIG. 5B, the ammonia addition requirement, e.g., ammonia addition requirement 348, can be determined by the feedback ammonia target module 344. The feedback ammonia target module 344 receives as input the desired tailpipe $NO_x$ level 306, the amount of $NH_3$ exiting the tailpipe as sensed by the tailpipe $NH_3$ sensor 166C, the $NH_3$ storage modifier 352, and a corrected tailpipe $NO_x$ value 399 (see FIG. 16). Further, the feedback ammonia target module 344 includes an exhaust flow properties module 345 and a tailpipe $NO_x$ feedback module 347. In contrast to the feedforward ammonia target module 310, the feedback ammonia target module 344 relies mainly on the properties of the exhaust gas stream after passing through the SCR catalyst 152 and adjusts the reductant dosing rate to compensate for errors and inconsistencies in the SCR system 150.

The exhaust flow properties module 345 is operable to determine various conditions of the exhaust gas stream, e.g., temperature, flow rate, etc., in a manner similar to that described above in relation to SCR catalyst inlet exhaust properties module 316.

The tailpipe $NO_x$ feedback module 347 is operable to determine a tailpipe $NO_x$ feedback value that can be utilized by the feedback ammonia target module 344 for determining the ammonia addition requirement 348. The tailpipe $NO_x$ feedback value accounts for inconsistencies in the SCR system 150, such as modeling errors, catalyst aging, sensor aging, reductant concentration variations, reductant injector delays, which can reduce the efficiency of the system. Therefore, the tailpipe $NO_x$ feedback module 396 is operable to modulate the tailpipe $NO_x$ feedback value to increase the efficiency of the SCR system 150 and achieve the desired $NO_x$ conversion efficiency despite inconsistencies that may be present in the system.

The tailpipe $NO_x$ feedback module 347 generates the tailpipe $NO_x$ feedback value by comparing the sensed amount of $NO_x$ as detected by the tailpipe $NO_x$ sensor 164D with the desired or targeted tailpipe $NO_x$ amount 306. Accordingly, the tailpipe $NO_x$ feedback value is at least partially dependent on the difference between the sensed tailpipe $NO_x$ and the targeted or desired tailpipe $NO_x$ 306. Generally, the greater the difference between the sensed tailpipe $NO_x$ and the targeted tailpipe $NO_x$ 306, the higher the ammonia addition requirement 348. For example, if the sensed amount of tailpipe $NO_x$ is relatively high compared to the targeted tailpipe $NO_x$ 306, then the feedback ammonia target module 344 can increase the ammonia addition requirement 348. As will be explained in more detail below, an increase in the ammonia addition requirement 348 can result in more reductant being added to the exhaust gas stream for increased $NO_x$ conversion on the SCR catalyst 152. Conversely, if the sensed amount of tailpipe $NO_x$ is relatively low compared to the targeted tailpipe $NO_x$ 306, then the feedback ammonia target module 344 can decrease the ammonia addition requirement, which may consequently result in less reductant being added to the exhaust gas stream to conserve reductant, and thus increase the efficiency of the SCR system 150.

In certain embodiments, because of the cross-sensitivity of some $NO_x$ sensors to ammonia, the feedback ammonia target module 344 is utilized by the SCR system 150 to generate the ammonia addition requirement only when ammonia is not slipping from the SCR system 150, e.g., slipping out of the tailpipe. Whether ammonia is slipping from the tailpipe can be sensed by the tailpipe $NH_3$ sensor 166C and/or predicted by the AMOX $NH_3$ conversion module 380, as will be described in more detail below.

In certain embodiments, the controller 130 includes a control logic selection algorithm (not shown) configured to select one of the ammonia addition requirements 326, 348 to act as the ammonia addition requirement for the SCR system 150 based at least partially on whether $NH_3$ is slipping from the tailpipe. In other words, the module used for determining the ammonia addition requirement for the SCR system 150 is switchable based on whether the SCR system is operating in a tailpipe $NH_3$ slip mode or a tailpipe $NH_3$ non-slip mode. More specifically, when $NH_3$ is slipping from the tailpipe, the ammonia addition requirement 326 determined by the feedforward ammonia target module 310 is communicated to the reductant target module 330 and used in the determination of the reductant injection requirement 332 (see FIG. 8). Conversely, when $NH_3$ is not slipping from the tailpipe, the ammonia addition requirement 348 determined by the feedback ammonia target module 344 is communicated to the reductant target module 330 and used in the determination of the reductant injection requirement 332. In some implementations, the control logic selection algorithm of the controller 130 determines the ammonia addition requirement based on a combination, e.g., an average, of the ammonia addition requirements 326, 348 regardless of whether ammonia is slipping from the tailpipe. In certain implementations, the ammonia addition requirement 326 can be adjusted according to the ammonia addition requirement 348.

In some embodiments, the feedback ammonia target module 344 includes a signal correction algorithm (not shown) configured to filter the signal from the tailpipe $NO_x$ sensor 164D such that the signal is suitable for yielding a more accurate $NO_x$ concentration at the tailpipe when ammonia is slipping from the tailpipe. Accordingly, in some implementations, the ammonia addition requirement 348 generated by the feedback ammonia target module 344 can be communicated to the reductant target module 330 during operation in the tailpipe $NH_3$ slip or non-slip mode.

As described above, the controller 130 can utilize the feedforward ammonia target module 310, the feedback ammonia target module 344, or both to determine an ammonia addition requirement for the SCR system 150. Once determined, the ammonia addition requirement, e.g., ammonia addition requirement 326, ammonia addition requirement 348, or combination of both, is communicated to the reductant target module 330, or more specifically, the inverse reductant hydrolysis module 334 of the reductant target module. As used hereafter, the ammonia addition requirement communicated to the reductant target module 330 will be referenced as the ammonia addition requirement 326. Nevertheless, it is recognized that any reference to the ammonia addition requirement 326 can be substituted with the ammonia addition requirement 348 or a combination of the ammonia addition requirements 326, 348.

Reductant Target Module

Figure 6:
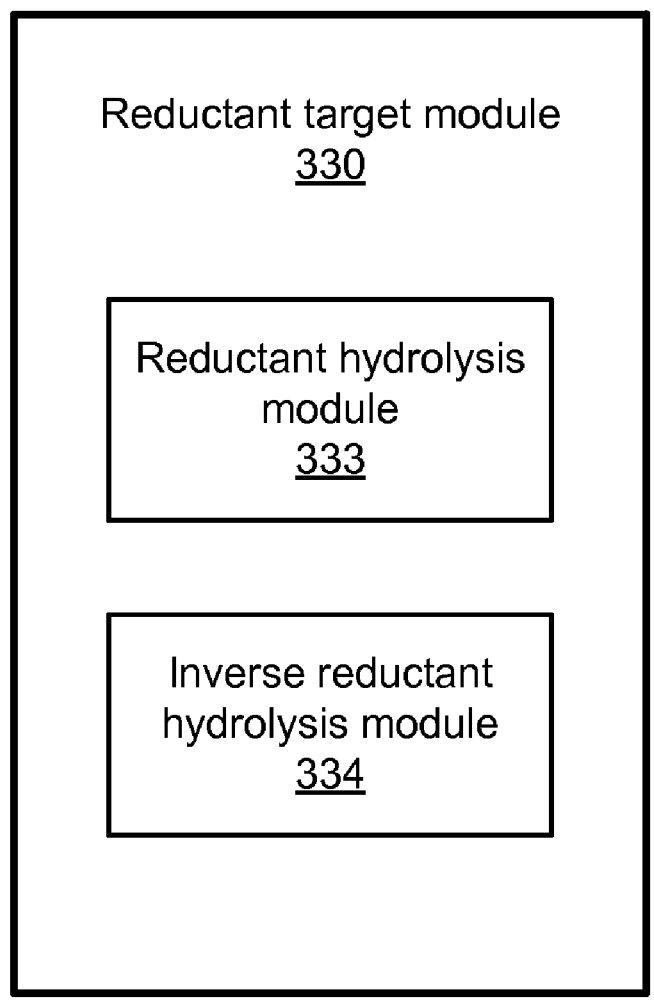
FIG. 6 is a schematic block diagram of a reductant target module of the controller of FIG. 3 according to one representative embodiment.

Referring to FIG. 6, the reductant target module 330 includes a reductant hydrolysis module 333 and an inverse reductant hydrolysis module 334. As will be described in more detail below, the reductant hydrolysis module 333 is operable to determine a current SCR catalyst inlet $NH_3$ flow rate 335 and a current SCR catalyst inlet HNCO flow rate 336 based on the current reductant dosing rate (see FIG. 7). The current SCR catalyst inlet $NH_3$ flow rate 335 and current SCR catalyst inlet HNCO flow rate 336 are then communicated to other various modules of the control system 150. In contrast to the reductant hydrolysis module 333, the inverse reductant hydrolysis module 334 is operable to receive the ammonia addition requirement 326 from the ammonia target module 310 and determine a reductant injection requirement or dosing rate 332, i.e., the amount of reductant necessary to achieve the ammonia addition requirement 326 (see FIG. 8). Based on the reductant injection requirement 332, the controller 130 commands the SCR system controls to inject an amount of reductant corresponding to the reductant injection requirement 332.

The reductant can be any of various reductants known in the art. For example, in one implementation, the reductant is ammonia. In other implementations, the reductant is urea, which breaks down into ammonia and other components as will be described in more detail below.

Reductant Hydrolysis Module

Referring back to FIG. 7, the reductant hydrolysis module 333 includes an $NH_3$ conversion efficiency table 337, an isocyanic acid (HNCO) conversion efficiency table 338, and an SCR catalyst inlet exhaust properties module 339. The SCR catalyst inlet exhaust properties module 339 is operable to determine the mass flow rate of the exhaust gas stream in a manner similar to that described above in relation to SCR catalyst inlet exhaust properties module 316 of FIG. 5. The reductant hydrolysis module 333 is communicable in data receiving communication with the reductant delivery mechanism 190 for receiving a current reductant dosing rate 383 and the exhaust temperature sensor 124B for receiving the temperature of the exhaust.

Figure 9:
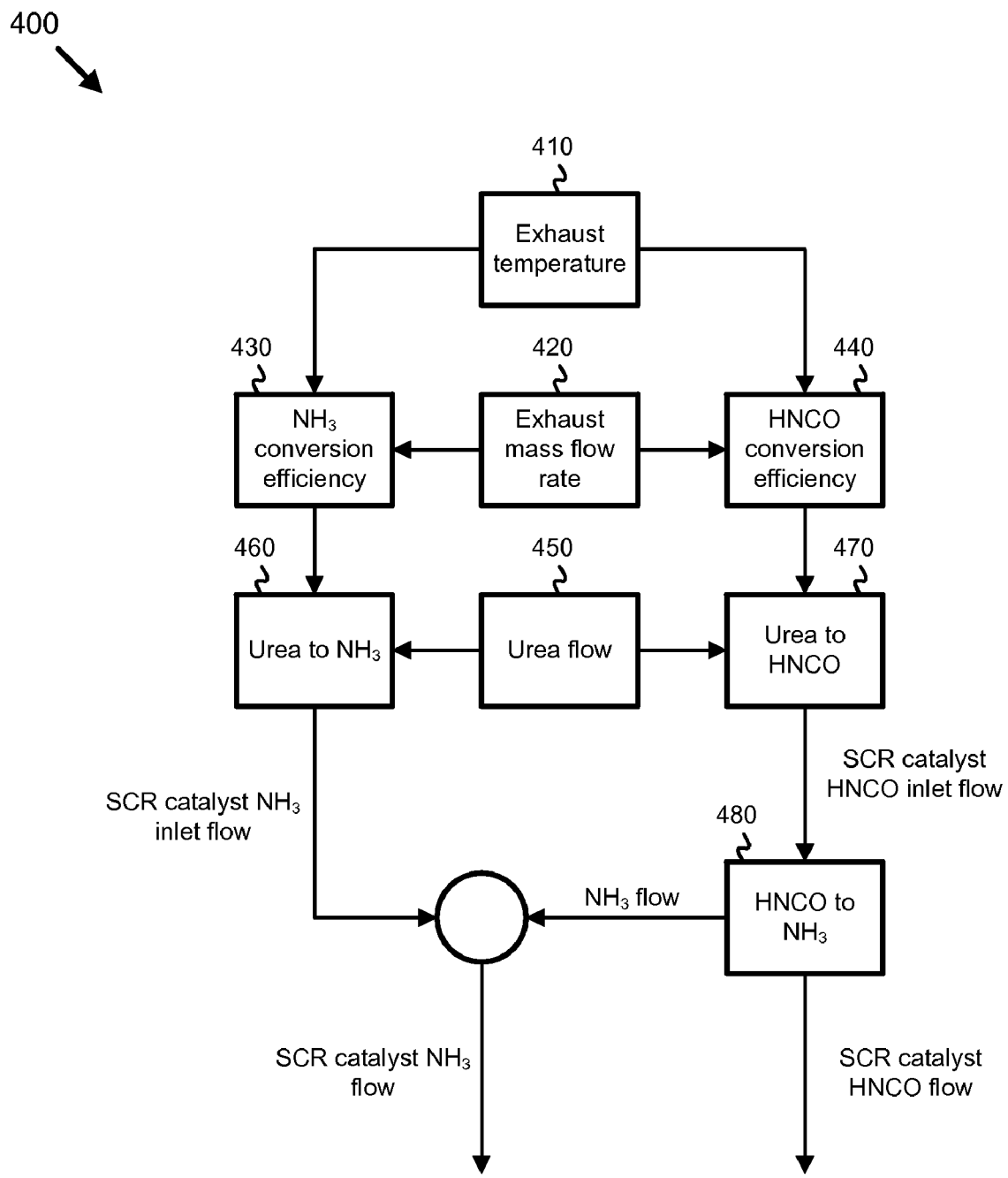
FIG. 9 is a schematic flow chart diagram of a control system operable to determine ammonia and isocyanic acid flow into an SCR catalyst according to one embodiment.

As described above, in implementations where the reductant is urea, the reductant hydrolysis module 333 is operable to determine the amount of ammonia and isocyanic acid entering the SCR catalyst 152. According to one embodiment, the reductant hydrolysis module 333 is operable to follow the schematic flow chart 400 of FIG. 9 to determine the current SCR catalyst inlet $NH_3$ and HNCO flow rates 335, 336, respectively. The exhaust temperature is sensed, such as by the temperature sensor 124B, or estimated, at 410 and the exhaust mass flow rate is estimated by the SCR catalyst inlet exhaust properties module 339 at 420. Based at least partially on the exhaust temperature determined at 410 and the exhaust mass flow rate determined at 420, the conversion efficiency of urea to $NH_3$ is determined at 430 and the conversion efficiency of urea to isocyanic acid (HNCO) is determined at 440. Accordingly, the conversion efficiencies of urea to $NH_3$ and isocyanic acid are a function of the exhaust gas temperature and mass flow rate. The $NH_3$ and HNCO conversion efficiencies are determined by comparing the exhaust gas temperature and mass flow rate to one or more predetermined efficiency values listed on $NH_3$ and HNCO conversion efficiency look-up tables 337, 338, respectively.

According to the reductant injection requirement 332 received by the SCR inlet ammonia and isocyanic acid module 360 from the reductant target module 330, urea is injected into the exhaust gas stream by a urea injector at 450. The urea is mixed with the exhaust gas stream flowing through an exhaust pipe between the urea injector and the surface of SCR catalyst 152. As the urea flows along the exhaust pipe, it reacts with the exhaust gas to form $NH_3$ at 460 and HNCO at 470. The $NH_3$ and HNCO in the exhaust gas stream then enter the SCR catalyst 152 as the current SCR catalyst inlet $NH_3$ flow rate 335 and current SCR catalyst inlet HNCO flow rate 336, respectively. After the HNCO enters the SCR catalyst 152, the catalyst bed promotes a reaction between at least a portion of the HNCO and water ($H_2O$) in the exhaust gas stream to form additional $NH_3$ at 480. The current SCR catalyst inlet $NH_3$ flow rate 335 and the current HNCO to $NH_3$ flow rate 341, i.e., the $NH_3$ from the conversion of HNCO to $NH_3$ occurring within the SCR catalyst 152 at 480, are combined to provide an estimation of the total amount of ammonia within the SCR catalyst, e.g., the current SCR catalyst $NH_3$ flow rate 343. The estimated amount of HNCO that is not converted to $NH_3$ at 480 flows through and out of the SCR catalyst 152 at an SCR catalyst outlet HNCO flow rate 349.

As discussed above, the amount of urea converted to $NH_3$ is at least partially dependent on the $NH_3$ conversion efficiency. In an ideal situation, the $NH_3$ conversion efficiency is 100% such that the all the urea converts to 2-parts ammonia and 1-part carbon dioxide without any intermediate conversion to HNCO according to the following equation:

$$NH_2\text{---}CO\text{---}NH_2(aq) + H_2O \rightarrow NH_3(g) + CO_2 \quad (5)$$

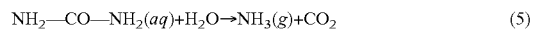

In actuality, the $NH_3$ conversion efficiency is typically less than 100% such that the urea converts to ammonia and isocyanic acid according to the following equation:

$$NH_2\text{---}CO\text{---}NH_2(s) \rightarrow NH_3(g) + HNCO(g) \quad (6)$$

The remaining isocyanic acid converts to ammonia and carbon dioxide $CO_2$ according to the HNCO conversion efficiency. In ideal situations, the HNCO conversion efficiency is 100% such that all the isocyanic acid converts to 1-part ammonia and 1-part carbon dioxide within the SCR catalyst 152 according to the following equation:

$$HNCO(g) + H_2O(g) \rightarrow NH_3(g) + CO_2(g) \quad (7)$$

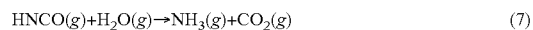

Typically, however, the HNCO conversion efficiency is less than 100% such that some of the HNCO is converted to ammonia and carbon dioxide and the remaining portion of HNCO is unconverted within the SCR catalyst 152.

The flow rate of $NH_3$ into the SCR catalyst 152 ($\dot{n}_{NH_3}(s)$) per flow rate of injected urea ($\dot{n}_{urea}(s)$) is estimated according to the following equation:

$$\frac{\dot{n}_{NH_3}(s)}{\dot{n}_{urea}(s)} = \frac{1}{\tau s + 1}(1 - e^{-x/L})\eta_{NH_3}(\dot{m}, T) \quad (8)$$

where $\tau$ is the mixing time constant, s is a complex variable used for Laplace transforms, L is the characteristic mixing length, x is the distance from the urea injector to the SCR catalyst inlet or face, and $\eta_{NH_3}$ is the $NH_3$ conversion efficiency from urea, which is based on the mass flow rate ($\dot{m}$) and temperature (T) of the exhaust gas. The complex variable s can be expressed as $\sigma + j\omega$, where $\sigma$ represents the amplitude and $\omega$ represents the frequency of a sinusoidal wave associated with a given urea dosing rate input. The mixing time constant is predetermined based at least partially on the Federal Test Procedure (FTP) heavy-duty transient cycle for emission testing of heavy-duty on-road engines. Assuming 100% conversion efficiency, the mixing time constant is tuned with the FTP data to eliminate transient mismatches. The characteristic length L is defined as the major linear dimension of the exhaust pipe that is substantially perpendicular to the exhaust gas flow. For example, for a cylindrical exhaust pipe, the major linear dimension is the diameter of the pipe. In some embodiments, the distance from the urea injector to the SCR catalyst face x is between about 5 and 15 times the characteristic length. In specific implementations, the distance x is about 10 times the characteristic length.

Similarly, the flow rate of isocyanic acid (HNCO) into the SCR catalyst 152 ($\dot{n}_{HNCO}(s)$) per flow rate of injected urea ($\dot{n}_{urea}(s)$) is estimated according to the following equation:

$$\frac{\dot{n}_{HNCO}(s)}{\dot{n}_{urea}(s)} = \frac{1}{\tau s + 1}(1 - e^{-x/L})\eta_{HNCO}(\dot{m}, T) \quad (9)$$

where $\eta_{HNCO}$ is the HNCO conversion efficiency from urea. The conversion efficiencies of urea to ammonia ($\eta_{NH_3}$) and urea to isocyanic acid ($\eta_{HNCO}$) is predetermined based on operating parameters of the engine system 10. In some implementations, the conversion efficiencies are tuned by comparing a measurement of the $NH_3$ and HNCO at the inlet of the SCR catalyst 152 with the expected amount of $NH_3$ and HNCO based on the stoichiometric reaction of Equation 6 while dosing urea into exhaust at specific mass flow rates and temperatures.

Inverse Reductant Hydrolysis Module

Figure 8:
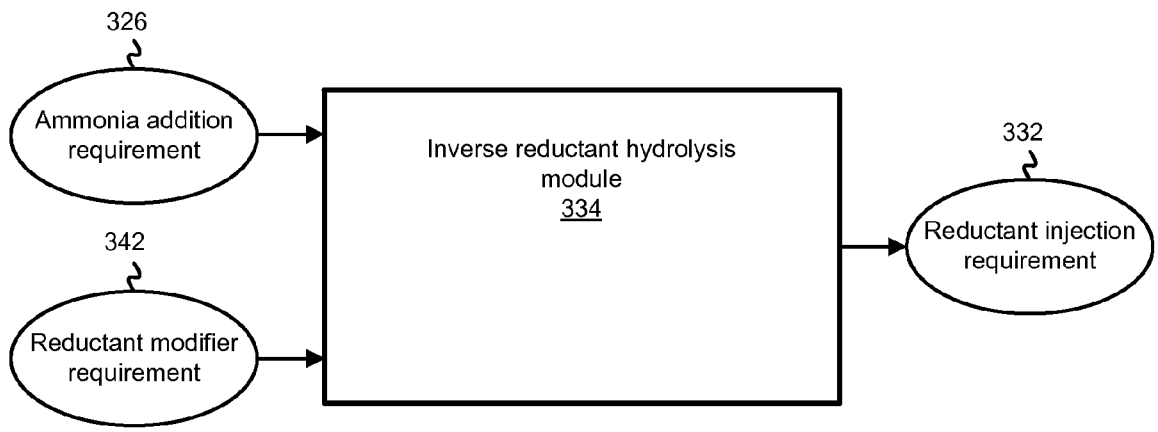
FIG. 8 is a schematic block diagram of an inverse reductant hydrolysis module of the reductant target module of FIG. 6 according to one representative embodiment.

Referring now to FIG. 8, based at least partially on the ammonia addition requirement 326 received from the ammonia target module 310, the inverse reductant hydrolysis module 334 of the reductant target module 330 is operable to determine the reductant injection requirement 332 to achieve the ammonia addition requirement 326 generated by the ammonia target module 310. In some implementations, the process used by the inverse reductant hydrolysis module 334 to determine the reductant injection requirement 332 is similar to the process illustrated in flow chart 400, but inverted. In other words, the same techniques used in flow chart 400 to determine the current SCR catalyst inlet $NH_3$ flow rate 335 can be used to determine the reductant injection requirement 332, but in a different order.

For example, in the flow chart 400, the actual urea dosing rate is known and used to determine the flow of $NH_3$ into the SCR catalyst 152. In contrast, in the process used by the inverse reductant hydrolysis module 334, the ammonia addition requirement 326, e.g., the desired or estimated flow of $NH_3$ into the SCR catalyst 152, is known and used to determine the corresponding reductant injection requirement, e.g., dosing rate, necessary to achieve the desired $NH_3$ flow rate. The reductant injection requirement 332 is determined by predicting the hydrolysis rates and conversion efficiencies of urea to $NH_3$ and HNCO based on the temperature and mass flow rate of the exhaust gas stream. For example, the inverse reductant hydrolysis module 334 can include an $NH_3$ conversion efficiency table, HNCO conversion efficiency table, and an SCR catalyst inlet exhaust properties module similar to the reductant hydrolysis module 333. Alternatively, the inverse reductant hydrolysis module 334 can access the $NH_3$ conversion efficiency table 337, HNCO conversion efficiency table 338, and output of the SCR catalyst inlet exhaust properties module 339 of the reductant hydrolysis module 333.

In some implementations, with the desired flow rate of $NH_3$ into the SCR catalyst 152 ($\dot{n}_{NH_3}(s)$), e.g., the ammonia addition requirement, known, the reductant injection requirement 332 is determined from Equation 8 above by solving for the flow rate of injected urea $\dot{n}_{urea}(s)$. In one specific implementation, the reduction injection requirement 332 expressed in terms of mL/hr of urea is approximately equal to:

$$\frac{mL}{hr} Urea \approx 1.85 * f(a) * \dot{m}NO_x \quad (10)$$

where $\dot{m}NO_x$ is equal to the mass flow rate of the total amount of $NO_x$ in the exhaust gas stream expressed in terms of grams/hour and $f(a)$ is a non-dimensional piecewise function where a is equal to the $NO_2/NO_x$ ratio expressed above in Equation 1. When NO is greater than or equal to $NO_2$, i.e., $NO_2/NO_x \leq 0.5$, $f(a)$ is equal to about one, and when NO is less than or equal to $NO_2$, i.e., $NO_2/NO_x \geq 0.5$ $f(a)$ is equal to:

$$\frac{2(a+1)}{3} \quad (11)$$

In another specific embodiment, the reduction injection requirement 332 is determined based on the ideal stoichiometric conversion of urea to ammonia and the ideal stoichiometric reduction of $NO_x$ on the SCR catalyst 152. When the level of NO in the exhaust gas stream is greater than or equal to the level of $NO_2$ in the exhaust gas, the amount of urea for reducing one gram of $NO_x$ is represented by Equation 12 below. When the level of NO in the exhaust gas is less than or equal to the level of $NO_2$ in the exhaust gas, the amount of urea for reducing one gram of $NO_x$ is represented by Equation 13 below, where a is equal to the $NO_2/NO_x$ ratio expressed above in Equation 1. As used in Equations 12 and 13, $MW_{urea}$ is the molecular weight of the urea to be injected and $MW_{NOx}$ is the molecular weight of $NO_x$ in the exhaust gas stream.

$$0.5 * \left(\frac{MW_{Urea}}{MW_{NOx}}\right) \quad (12)$$

$$0.5 * \left(\frac{MW_{Urea}}{MW_{NOx}}\right) * \frac{2(a+1)}{3} \quad (13)$$

Based on Equations 12 and 13, the flow rate of urea in terms of grams per second can be expressed in terms of the mass flow rate of $NO_x$ ($\dot{m}_{NOx}$) in the exhaust gas stream. For example, when the amount of NO in the exhaust gas stream is more than or equal to the amount of $NO_2$ in the exhaust gas stream, the flow rate of urea can be expressed according to the following equation:

$$\frac{\dot{m}_{NOx}}{0.5 * \left(\frac{MW_{Urea}}{MW_{NOx}}\right)} \quad (14)$$

where $MW_{urea}$ is the molecular weight of urea, and $MW_{NOx}$ is the molecular weight of $NO_x$ in the exhaust gas stream. When the amount of NO in the exhaust gas stream is less than or equal to the amount of $NO_2$ in the exhaust gas stream, the flow rate of urea can be expressed according to the following equation:

$$\frac{\dot{m}_{NOx}}{0.5 * \left(\frac{MW_{Urea}}{MW_{NOx}}\right)\frac{2(a+1)}{3}} \tag{15}$$

Figure 15:
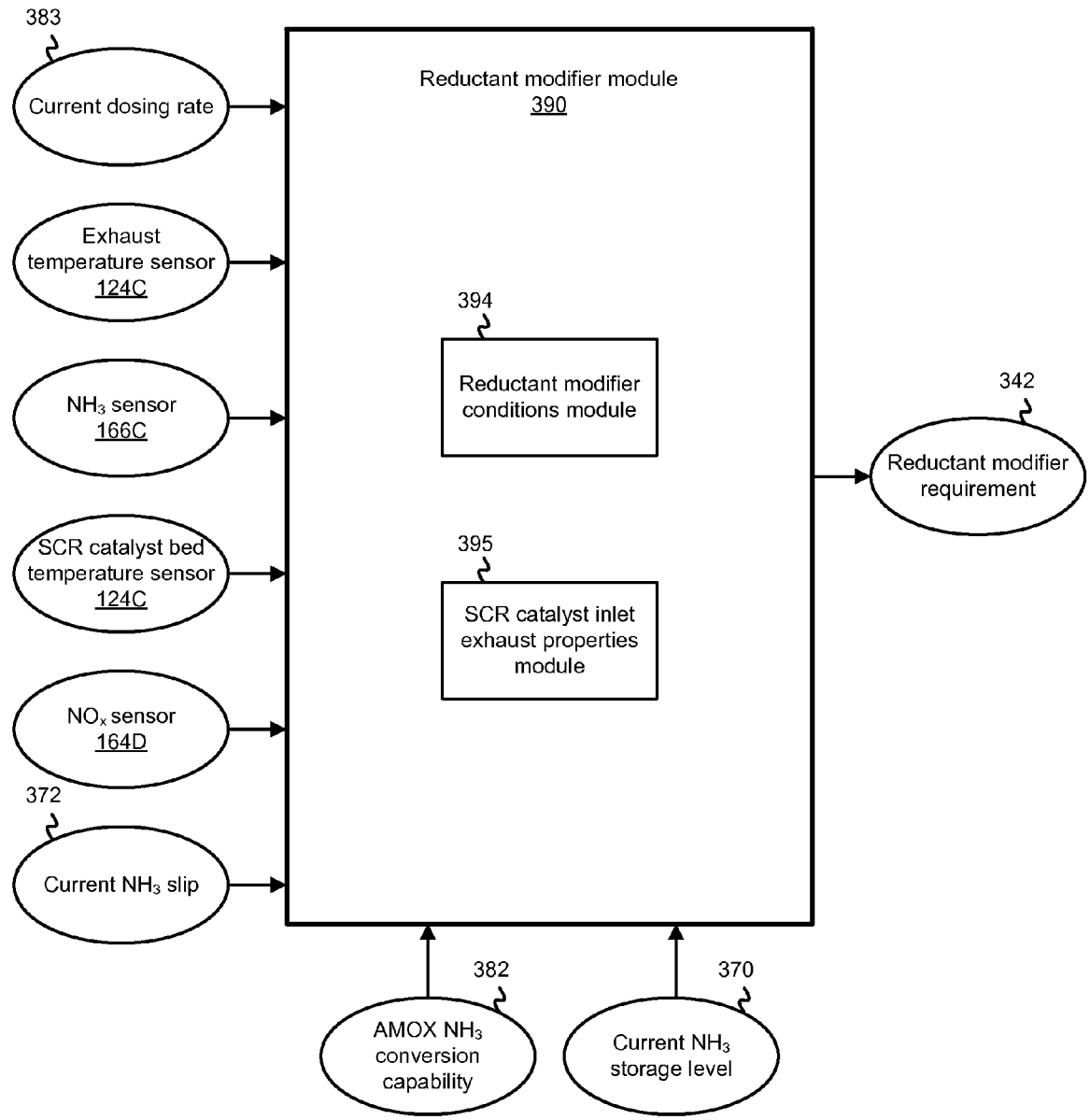
FIG. 15 is a schematic block diagram of a reductant modifier module of the controller of FIG. 3 according to one representative embodiment.

In some implementations, the inverse reductant hydrolysis module 334 is communicable in data receiving communication with the reductant modifier module 390 to receive a reductant modifier requirement 342 (see FIG. 15). As will be described in more detail below, the reductant modifier requirement 342 includes instructions for increasing or decreasing the reductant injection requirement 332 based on whether one or more reductant limiting conditions are present. Accordingly, the inverse reductant hydrolysis module 334 is operable to modify the reductant injection requirement 332 according to the reductant modifier requirement 342.

Ammonia Storage Module

Figure 10:
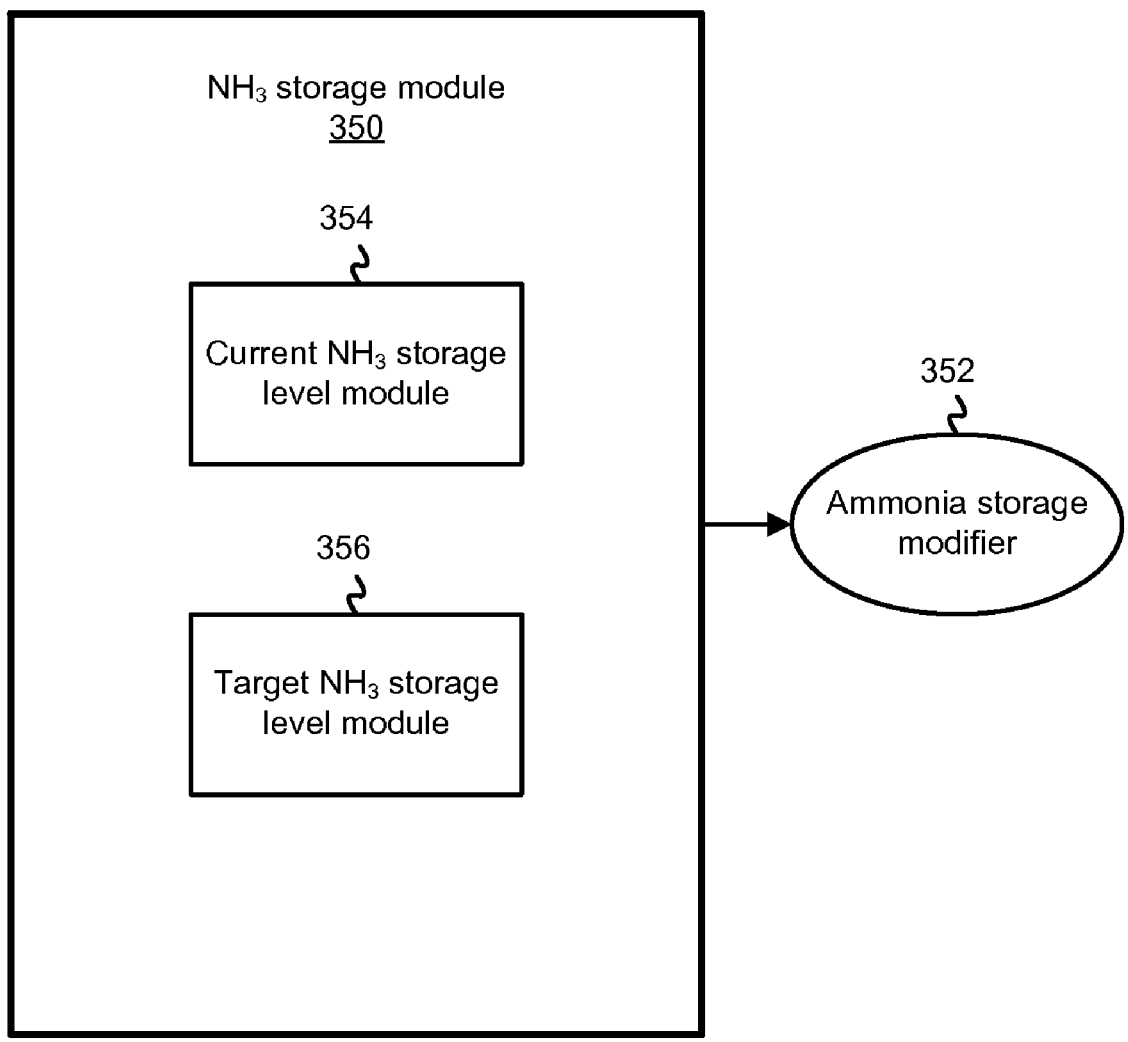
FIG. 10 is a schematic block diagram of an ammonia storage module of the controller of FIG. 3 according to one representative embodiment.

Referring to FIG. 10, the $NH_3$ storage module 350 is operable to determine an ammonia storage modifier or storage compensation command 352. Generally, the ammonia storage modifier 352 includes information regarding the state of ammonia storage on the SCR catalyst 152. More specifically, the ammonia storage modifier 352 includes instructions on whether ammonia entering the SCR catalyst 152 should be increased or decreased, e.g., whether the ammonia addition requirement should be increased or decreased. The ammonia target module 310 is communicable in data receiving communication with the $NH_3$ storage module 350 to receive the ammonia storage modifier 352 as an input value. Based on the ammonia storage modifier 352, the ammonia target module 310 is operable to adjust, e.g., increase or decrease, the ammonia addition requirement 326 to compensate for modulations in the ammonia storage level on the SCR catalyst 152 and maintain a sufficient amount of stored $NH_3$ on the SCR catalyst for transient operations of the engine 11.

As discussed above, the performance of the SCR system 150 is defined by the conversion efficiency of $NO_x$ in the exhaust gas stream and the amount of ammonia that has slipped out of the tail-pipe over both steady-state and transient duty cycles. During transient duty cycles, the response of conventional control systems that monitor only the $NO_x$ level at the tailpipe outlet typically are limited by the dynamics of the reductant dosing system, the cross-sensitivity of the $NO_x$ sensor to $NH_3$, and other factors. Accordingly, conventional control systems may have unstable feedback controls during transient duty cycles. To improve the response and feedback controls during transient duty cycles, the SCR system 150 utilizes $NH_3$ stored on the SCR catalyst to manage transient $NO_x$ spikes that may occur during transient operation or cycles of the engine 11. Further, $NH_3$ stored on the SCR catalyst 152 can be used to reduce $NO_x$ when engine system operating conditions, such as low SCR catalyst bed temperatures, require a reduction or elimination of reductant dosing. The $NH_3$ storage module 350 is configured to monitor and regulate the amount of ammonia stored on the SCR catalyst 152 such that a sufficient amount of stored $NH_3$ is maintained on the SCR catalyst to accommodate transient $NO_x$ variations and low catalyst bed temperatures as well as reduce $NH_3$ slip.

The $NH_3$ storage module 350 includes a current $NH_3$ storage level module 354 and a target $NH_3$ storage level module 356. The modules 354, 356 process one or more inputs received by the $NH_3$ storage module 350 as will be explained in more detail below.

Current Ammonia Storage Level Module

Figure 11:
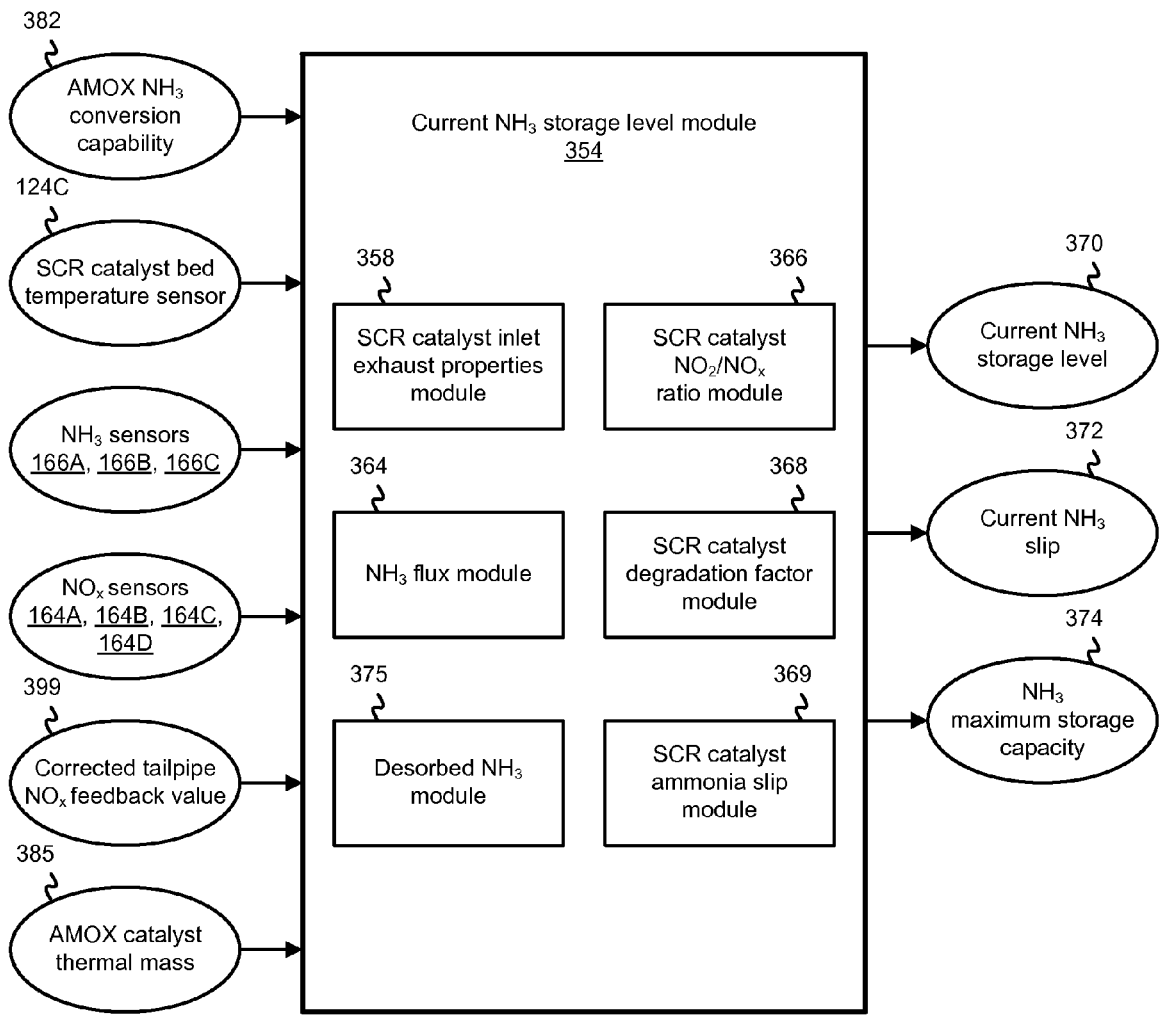
FIG. 11 is a schematic block diagram of a current ammonia storage level module of the ammonia storage module of FIG. 10 according to one representative embodiment.

Referring to FIG. 11, the current $NH_3$ storage level module 354 is communicable in data receiving communication with several sensors for receiving data sensed by the sensors. In the illustrated embodiment, the several sensors include at least the SCR catalyst bed temperature sensor 124C, $NH_3$ sensors 166A-C, and $NO_x$ sensors 164A-D. The current $NH_3$ storage level module 354 also is capable of receiving an AMOX $NH_3$ conversion capability 382 value and a corrected tailpipe $NO_x$ value 399 as will be described in further detail below.

The current $NH_3$ storage level module 354 also includes an SCR catalyst inlet exhaust properties module 358, an $NH_3$ flux module 364, an SCR catalyst inlet $NO_2/NO_x$ ratio module 366, an SCR catalyst degradation factor module 368, an SCR catalyst $NH_3$ slip module 369, and an $NH_3$ desorption module 375. Based on input received from the sensors 124C, 166A,-C, 164A-D, the AMOX $NH_3$ conversion capability 382 (if an AMOX catalyst is used), the tailpipe $NO_x$ feedback value 399, and operation of the modules 358, 364, 366, 368, 369, 375, the current $NH_3$ storage level module 354 is operable to determine the current $NH_3$ storage level 370 (e.g., an estimate of the current amount of $NH_3$ stored on the SCR catalyst 152 based at least partially on the SCR catalyst bed temperature), the current $NH_3$ slip 372 (e.g., an estimate of the current amount of $NH_3$ exiting the SCR catalyst), and the $NH_3$ maximum storage capacity 374 (e.g., an estimate of the maximum amount of $NH_3$ capable of being stored on the SCR catalyst based under current conditions). The fraction of the available storage on the SCR catalyst that is filled can be determined by dividing the current $NH_3$ storage level 370 by the $NH_3$ maximum storage capacity 374.

The $NO_x$ sensor 164B being embedded within the SCR catalyst 152 provides several advantages over prior art systems. For example, placing the $NO_x$ sensor 164B inside the SCR catalyst 152 improves the monitoring of stored ammonia on the catalyst by reducing the signal-to-noise ratio of the $NO_x$ sensor. The $NO_x$ sensor 164B can be used with other $NO_x$ sensors in the exhaust aftertreatment system 100 to quantify the spatial distribution of stored ammonia.

The SCR catalyst inlet exhaust properties module 358 is similar to SCR catalyst inlet exhaust properties module 316 of the ammonia target module 310. For example, the exhaust properties module 358 is operable to determine various properties of the exhaust, such as the temperature and flow rate of the exhaust.

The $NH_3$ flux module 364 is operable to determine the rate at which $NH_3$ flows into the SCR catalyst 152. The $NH_3$ flux module 364 can also process data concerning the amount of $NH_3$ present at the tailpipe outlet as sensed by the $NH_3$ sensor 166C. The $NH_3$ sensor 166C at the tailpipe outlet assists in the measurement and control of the tailpipe $NH_3$ slip by providing information regarding the tailpipe $NH_3$ slip to various modules of the controller 130. In some instances, the modules, e.g., the target $NH_3$ storage level module 356 and the reductant modifier module 390, adjust the urea dosing rate and the ammonia storage targets based at least partially on the tailpipe $NH_3$ slip information received from the $NH_3$ sensor.

The SCR catalyst inlet $NO_2/NO_x$ ratio module 366 is similar to the SCR catalyst inlet $NO_2/NO_x$ ratio module 314 of the ammonia target module 310. For example, the SCR catalyst inlet $NO_2/NO_x$ ratio module 366 is operable to predict the $NO_2/NO_x$ ratio of the exhaust gas in the exhaust gas stream according to Equation 1.

The SCR catalyst degradation factor module 368 is operable to determine a degradation factor or condition of the SCR catalyst 152 in a manner the same as or similar to the $NO_x$ reduction efficiency module 312 of the ammonia target module 310 described above.

Figure 12:
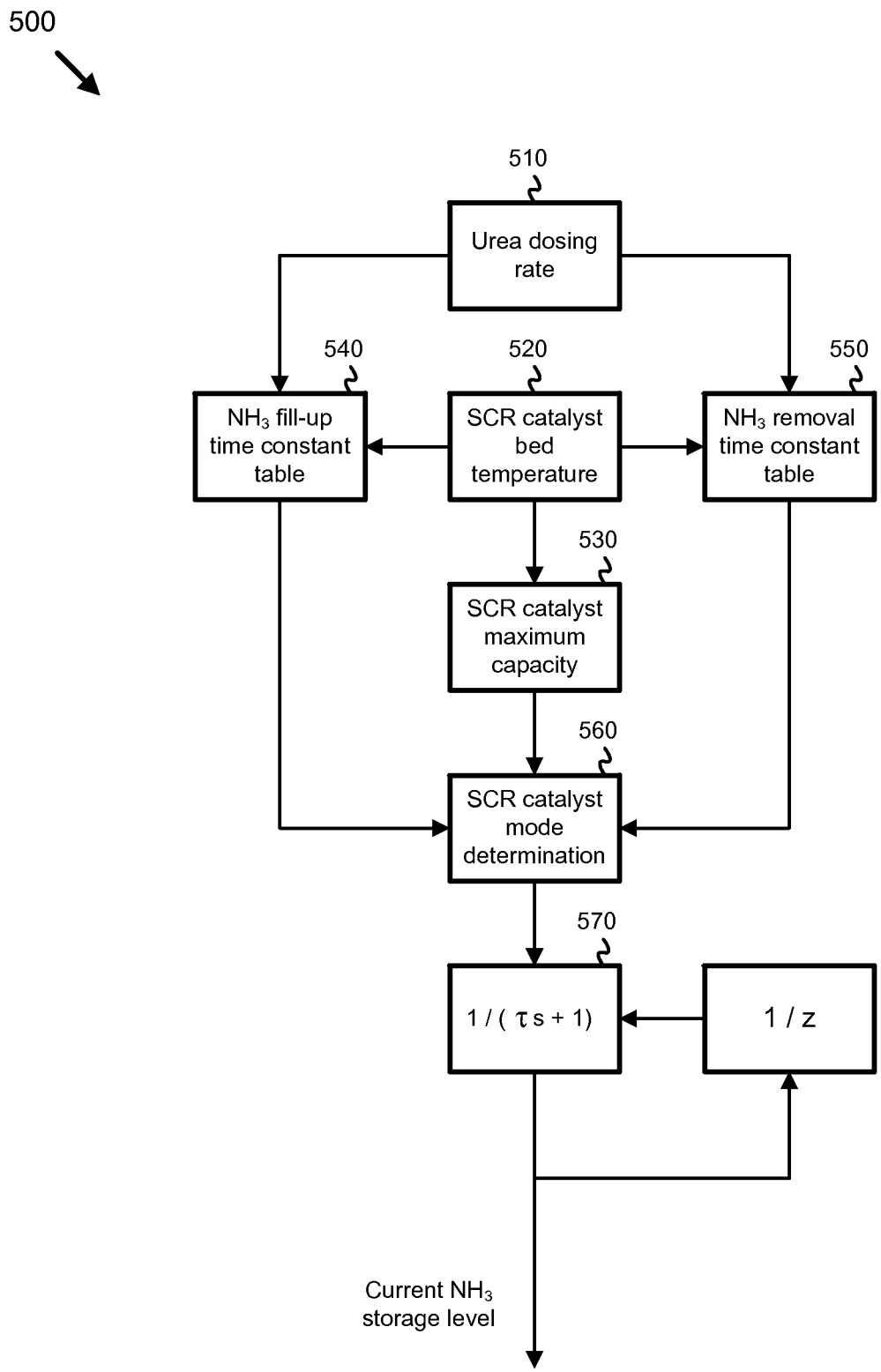
FIG. 12 is a schematic flow chart diagram of a control system operable to determine the storage level of ammonia on an SCR catalyst.

According to one embodiment, the current NH$_3$ storage level module 354 determines the estimated current NH$_3$ storage level 370 by utilizing, at least in part, the current condition of the SCR catalyst bed, the size and properties of the SCR catalyst bed, and the ammonia flux entering the SCR catalyst. Referring to FIG. 12, and according to one exemplary embodiment, the NH$_3$ storage level module 354 utilizes the schematic flow chart 500 to determine the current NH$_3$ storage level 370 on the SCR catalyst 152. The reductant target module 330 is operable to determine the reductant injection requirement 332, e.g., urea dosing rate, at 510. Alternatively, the current NH$_3$ storage level module 354 is communicable in data receiving communication with the reductant delivery mechanism 190 for receiving the current reductant dosing rate 383. The SCR catalyst bed temperature sensor 124C senses, or a bed temperature module estimates, the temperature of the SCR catalyst bed temperature at 520.

Based at least partially on the temperature of the SCR catalyst bed as determined at 520, the NH$_3$ maximum storage capacity 374 is generated by the current NH$_3$ storage level module 354 at 530. The NH$_3$ maximum storage capacity 374 is dependent on the temperature of the SCR catalyst bed and can be determined by comparing the SCR catalyst bed temperature against a pre-calibrated look-up table. The urea dosing rate, which corresponds to the ammonia flux entering the SCR catalyst 152, and SCR catalyst bed temperature are used to determine an NH$_3$ fill-up or adsorption time constant and the SCR catalyst bed temperature and NO$_x$ flux are used to determine an NH$_3$ removal or desorption time constant. The time constants can be retrieved from respective look-up tables 540, 550 stored on, for example, the current NH$_3$ storage level module 354.

A determination of the SCR catalyst mode is made at 560. Based on whether the SCR catalyst 152 is in an NH$_3$ fill-up mode or an NH$_3$ removal mode, the corresponding time constant ($\tau$) is used to calculate the current NH$_3$ storage level (NH$_3$Storage) at 570 according to the following first order dynamics equation:

$$\mathrm{NH_3Storage} = \mathrm{NH_3}Storage_{MAX}\left(\frac{1}{\tau s + 1}\right) \quad (16)$$

where NH$_3$Storage$_{MAX}$ is the NH$_3$ maximum storage capacity 374 of the SCR catalyst 152 and s is the complex variable used for Laplace transforms. In other words, if it is determined at 560 that more ammonia should be stored on the SCR catalyst 152, the NH$_3$ adsorption time constant determined at 540 is used in Equation 16 to determine the current NH$_3$ storage level 370. Alternatively, if it is determined at 560 that ammonia should be removed from the SCR catalyst 152, the NH$_3$ desorption time constant determined at 550 is used in Equation 16 to determine the current NH$_3$ storage level 370. Accordingly, the current NH$_3$ storage level 370 is at least partially based on the ammonia flux, temperature of the catalyst and degradation of the catalyst.

In at least one embodiment, the storage mode, e.g., fill-up or removal mode, of the SCR catalyst 152 is determined by the NH$_3$ storage module 350 by comparing the NH$_3$ maximum storage capacity 374 with the current NH$_3$ storage level 370. If the NH$_3$ maximum storage capacity 374 is less than the current NH$_3$ storage level 370 then the SCR catalyst 152 is in the desorption mode. Similarly, if the NH$_3$ maximum storage capacity 374 is more than the current NH$_3$ storage level 370 then the SCR catalyst 152 is in the adsorption mode.

The look-up tables utilized at 540, 550 include a listing of the adsorption and desorption time constants, respectively, corresponding to various possible urea dosing rates and SCR catalyst bed temperatures. In certain implementations, the adsorption time constants can be calibrated using steady-state testing. For example, the engine 11 can be run at specific steady state modes such that the temperature of SCR catalyst bed reaches and is held at a specific temperature corresponding to each mode. Prior to reaching each mode, the SCR catalyst 152 is clean such that the catalyst bed does not contain stored ammonia, i.e., the amount of NO$_x$ coming out of the engine is the same as the amount of NO$_x$ coming out of the SCR catalyst. For each respective mode, the reductant target module 330 is operable to communicate to the reductant delivery mechanism 190 to inject an amount of reductant necessary to achieve 100% conversion of NO$_x$. The amount of reductant can vary for different stoichiometric reactions rates ranging, for example, between about 0.5 to about 2.0. The amount of time between the initial reductant dosing and ammonia slippage from the SCR catalyst 152 is determined for each mode at each stoichiometric reaction dosing rate and used to calibrate the adsorption time constants in the NH$_3$ fill-up time constant table.

The desorption time constants in the NH$_3$ removal time constant table can be calibrated during the same test used for calibrating the adsorption time constants. For example, after NH$_3$ begins to slip from the SCR catalyst 152 as described above, the NH$_3$ slip and NO$_x$ leaving the SCR catalyst are monitored until they stabilize or become constant. Once the NH$_3$ slip and SCR catalyst outlet NO$_x$ are stable, the urea dosing is discontinued and the amount of time between discontinuation of urea dosing and the SCR catalyst outlet NO$_x$ to equal the engine outlet NO$_x$ is determined for each mode at each stoichiometric reaction dosing rate.

If desired, the adsorption and desorption time constants can be further calibrated to compensate for transient operation of the engine 11. For example, the Fourier Transform Infrared (FTIR) measurements of ammonia slip values and the time between the beginning of a transient FTP cycle and slippage from the SCR catalyst can be used to fine-tune the adsorption and desorption time constants. More specifically, the time constants can be adjusted based on a least squares approach that can provide the best first order model fit to the transient data.

The target NH$_3$ storage level module 356 is operable to determine a target NH$_3$ storage level based at least in part on the NH$_3$ maximum storage capacity 374 determined by the current NH$_3$ storage level module 354. Generally, the target NH$_3$ storage level module 356 determines the target NH$_3$ storage level by multiplying the NH$_3$ maximum storage capacity 374 by an ammonia storage level fraction. The ammonia storage level fraction can be any of various fractions, such as fifty percent, seventy-five percent, ninety percent, and one-hundred percent. The ammonia storage level fraction is determined based at least partially on the SCR catalyst degradation factor and user defined maximum allowable ammonia slip.

Once the current NH$_3$ storage level 370 and the target NH$_3$ storage level are determined, the NH$_3$ storage module 350 utilizes the current NH$_3$ storage level 370 as feedback and compares the current NH$_3$ storage level and the target NH$_3$ storage level. If the current NH$_3$ storage level is less than the target NH$_3$ storage level, the ammonia storage modifier 352 is set to a positive value. If the current NH$_3$ storage level 370 is more than the target NH$_3$ storage level, the ammonia storage modifier 352 is set to a negative value. The positive and negative values can vary depending on how much less or more the current $NH_3$ storage level 370 is compared to the target $NH_3$ storage level. The ammonia storage modifier 352 is communicated to the ammonia target module 310 (see FIG. 5). An ammonia storage modifier 352 with a positive value indicates to the ammonia target module 310 that the ammonia addition requirement 326 should be cc am correspondingly increased. In contrast, an ammonia storage modifier 352 with a negative value indicates to the ammonia target module 310 that the ammonia addition requirement 326 should be correspondingly decreased.

The amount of $NH_3$ storage on the catalyst 152 can be controlled by controlling any of various inputs into the SCR system 150. For example, referring to FIG. 12, the amount of ammonia storage on the SCR catalyst 152 is dependent on the following separately controllable factors: the urea dosing rate, the SCR catalyst bed temperature, and the SCR catalyst maximum capacity. Accordingly, the controller 130 can be operable to selectively or cooperatively control the current $NH_3$ storage level on the SCR catalyst 152.

The ammonia storage modifier 352 also can be adjusted according to the current $NH_3$ storage slip 372, the presence or absence of an AMOX catalyst, such as AMOX catalyst 160, and if an AMOX catalyst is used, the conversion capability 382 of the AMOX catalyst.

Figure 13:
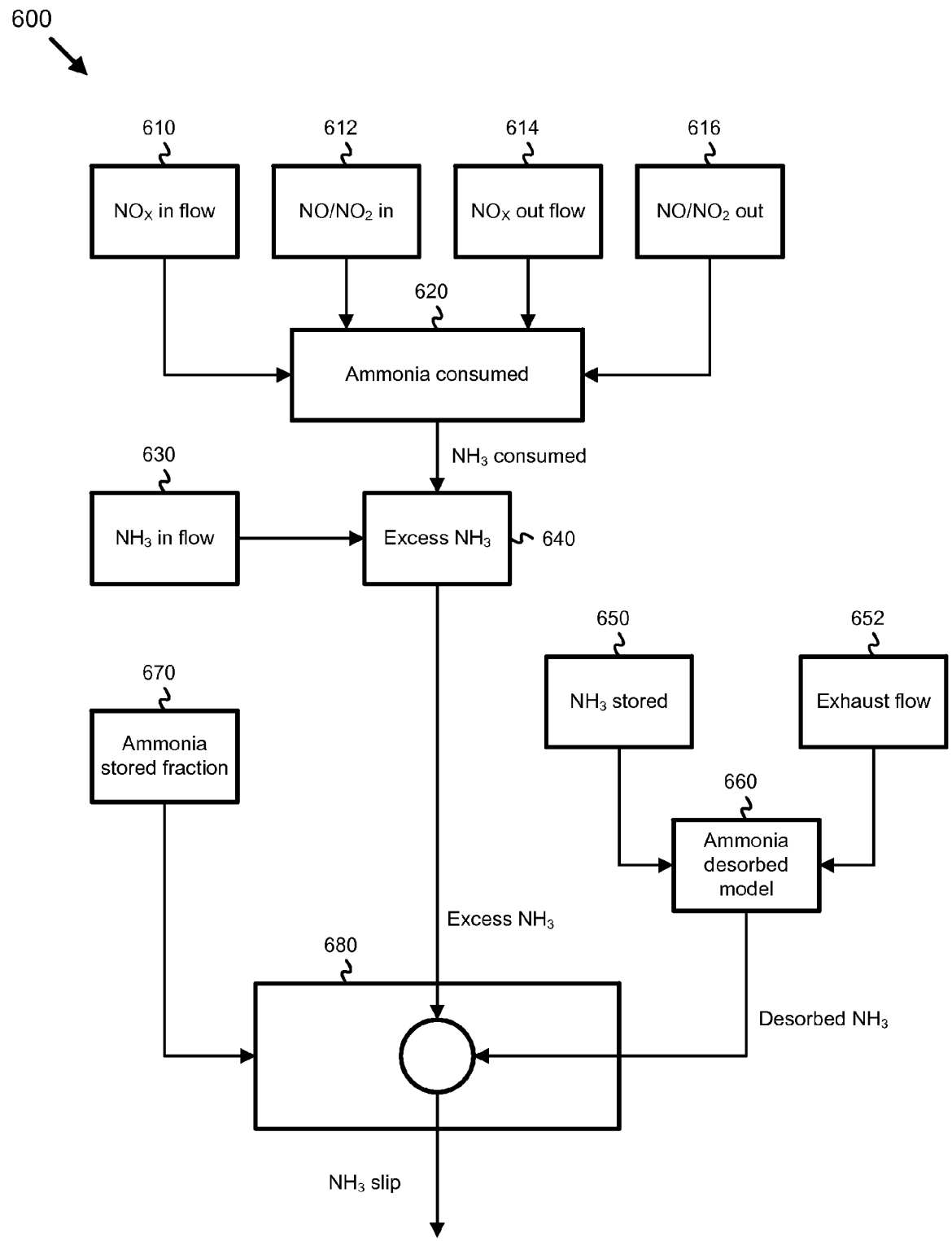
FIG. 13 is a schematic flow chart diagram of a control system operable to determine the amount of ammonia slip from an SCR catalyst.

According to one embodiment, the SCR catalyst ammonia slip module 369 determines the estimated current $NH_3$ slip 372 from the SCR catalyst 152 by utilizing, at least in part, the ammonia and $NO_x$ flux entering the catalyst, the size and properties of the SCR catalyst bed, and the ratio of NO to $NO_2$. Referring to FIG. 13, and according to one exemplary embodiment, the ammonia slip module 369 utilizes the schematic flow chart 600 to determine the current $NH_3$ slip 372 from the SCR catalyst 152. The amount of $NO_x$ at the inlet of the SCR catalyst 152 is determined at 610 and the amount of $NO_x$ at the outlet of the SCR catalyst is determined at 614. The $NO_x$ inlet amount can be sensed by the $NO_x$ sensor 164A and the $NO_x$ outlet amount can be sensed by the $NO_x$ sensor 164C or $NO_x$ sensor 164D. To account for any degradation of the sensor 164D, the output of the $NO_x$ sensor 164D can be corrected as described above in relation to corrected tailpipe $NO_x$ module 362. The ratio of NO to $NO_2$ in the exhaust gas stream at the inlet of the SCR catalyst 152 is determined at 612 and the ratio of NO to $NO_2$ in the exhaust gas stream at the outlet of the SCR catalyst is determined at 616. In some implementations, the SCR catalyst $NO_2/NO_x$ ratio module 366 is operable to determine the NO to $NO_2$ ratios at the inlet and outlet of the SCR catalyst 152, respectively.

At 620, the amount of ammonia consumed within the SCR catalyst 152 is calculated based on the net loss, e.g., conversion, of NO and $NO_2$ from the exhaust gas stream. In some implementations, the calculation is performed by the current $NH_3$ storage level module 354. Based at least partially on the flow of $NH_3$ into the SCR catalyst 152 determined at 630 and the amount of ammonia consumed within the SCR catalyst 152, the excess amount of $NH_3$ within the SCR catalyst is estimated at 640. As described above, the amount of $NH_3$ flowing into the SCR catalyst 152 can be determined by utilizing flow chart 400 of FIG. 10.

Further, based at least partially on the current $NH_3$ storage level 370 determined at 650, the flow rate of the exhaust gas stream into and through the SCR catalyst 152 determined at 652, and the temperature of the SCR catalyst bed determined at 653, the amount of ammonia desorbed from the bed of the SCR catalyst 152 is estimated at 660. Generally, desorption of ammonia occurs when there is a specific increase in the temperature of the SCR catalyst bed. The amount of temperature increase necessary to effect desorption of ammonia is at least partially dependent on the condition and type of SCR catalyst being used. As shown in FIG. 11, the current $NH_3$ storage level module 354 can include the desorbed $NH_3$ module 375, which is operable to estimate the amount of ammonia desorbed from the bed of the SCR catalyst 152. In certain implementations, the $NH_3$ storage level module 354 estimates the amount of ammonia desorbed from the SCR catalyst bed based on the excess $NO_x$ flux available for reduction reaction on the SCR catalyst surface.

Based at least partially on the excess amount of $NH_3$ within the SCR catalyst 152, the amount of $NH_3$ desorbed from the SCR catalyst bed, and the amount of $NH_3$ stored on the SCR catalyst relative to the $NH_3$ maximum storage capacity 374 of the catalyst, i.e., the fraction of the SCR catalyst occupied by stored ammonia, the amount of $NH_3$ slipping from the SCR catalyst is estimated at 680. The amount of $NH_3$ slipping from the SCR catalyst 152 is equal to the sum of the excess amount of $NH_3$ determined at 640 and the desorbed amount of $NH_3$ determined at 660. The fraction of the SCR catalyst occupied by stored ammonia is determined at 670 by dividing the $NH_3$ stored on the catalyst as determined at 650 by the $NH_3$ maximum storage capacity determined, for example, at 530 of flow diagram 500. Generally, if the total amount of $NH_3$ stored on the SCR catalyst 152 is greater than the $NH_3$ maximum storage capacity 374, i.e., the ammonia stored fraction determined at 670 is greater than one, then ammonia slip from the catalyst is occurring and the amount of slip is determined at 680. If the total amount of $NH_3$ within the SCR catalyst is less than the $NH_3$ maximum storage capacity 374, i.e., the ammonia stored fraction is less than one, then ammonia slip is not occurring and the amount of ammonia slip is not calculated at 680. In other words, the model used to compute the ammonia slip at 680 does not become active until the SCR catalyst 152 is full with ammonia, or the SCR catalyst bed temperature and rate of increase of the SCR catalyst bed temperatures are above predetermined thresholds.

The amount of $NH_3$ slip from the catalyst 152 can be controlled by controlling any of various inputs into the SCR system 150. For example, referring to FIG. 13, the amount of ammonia slip from the SCR catalyst 152 is dependent on the following separately controllable factors: the amount of $NH_3$ flowing into the SCR catalyst as determined at 630; the exhaust flow rate as determined at 652; and the current in $NH_3$ storage level as determined using flow chart 500. Accordingly, the controller 130 can be operable to selectively or cooperatively control the $NH_3$ slip from the SCR catalyst.

If the current $NH_3$ storage slip 372 is relatively high, such as when the temperature of the SCR catalyst bed exceeds a predetermined level, then the $NH_3$ storage module is operable to decrease the ammonia storage modifier 352. In contrast, if the current $NH_3$ storage slip 372 is relatively low, then the $NH_3$ storage module is operable to increase or hold steady the ammonia storage modifier 352.

AMOX Ammonia Conversion Module

Figure 14:
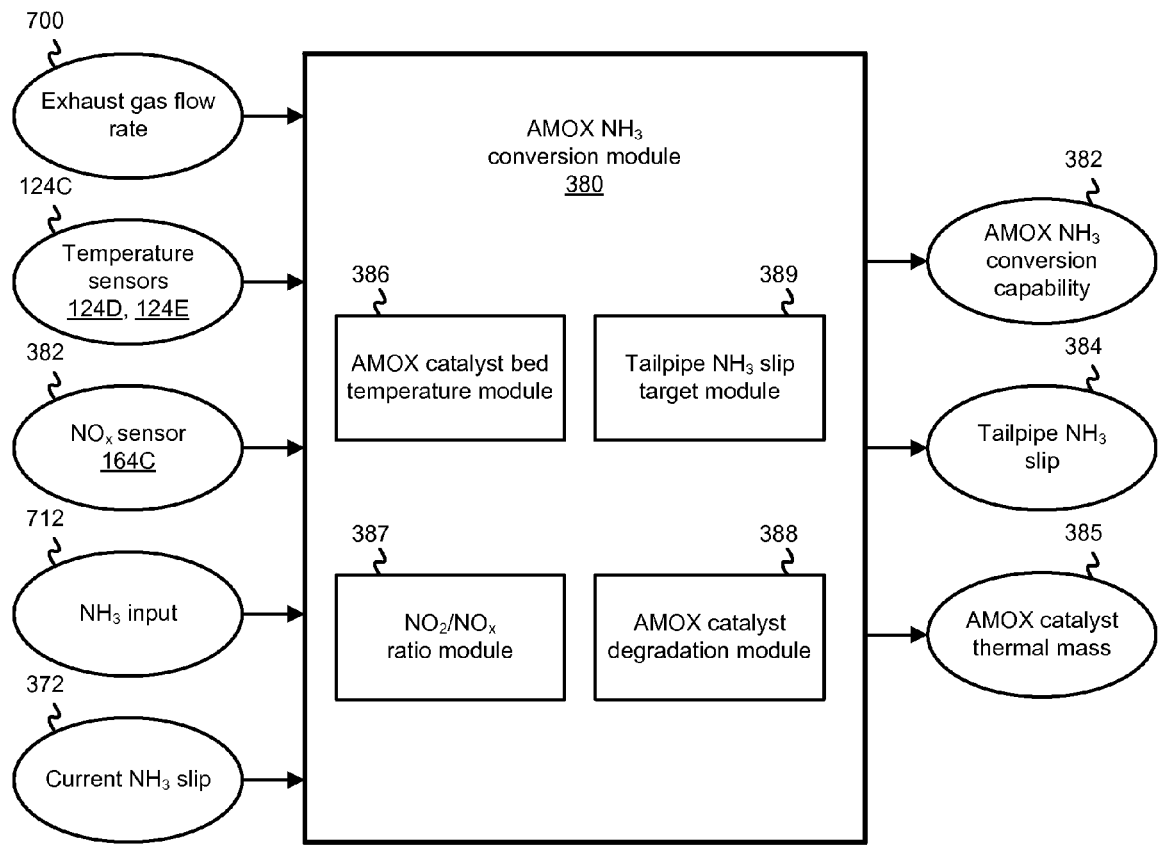
FIG. 14 is a schematic block diagram of an AMOX catalyst ammonia conversion module of the controller of FIG. 3 according to one representative embodiment.

According to one embodiment shown in FIG. 14, the AMOX $NH_3$ conversion module 380 determines an AMOX $NH_3$ conversion capability or efficiency 382, a tailpipe $NH_3$ slip 384 and an AMOX catalyst thermal mass 385. Generally, the $NH_3$ conversion capability 382 represents an estimate of the ability of the AMOX catalyst 160 to convert $NH_3$ to $N_2$ and other less harmful or less noxious components. The tailpipe $NH_3$ slip 384 represents an estimate of the amount of $NH_3$ exiting the AMOX catalyst 160. As will be described in more detail below, the AMOX thermal mass 385 is a measure of the AMOX catalyst's ability to conduct and store heat.

The AMOX $NH_3$ conversion module 380 receives input regarding the exhaust gas flow rate 700 entering the AMOX catalyst 160 and the amount of $NH_3$ entering the AMOX catalyst. In some implementations, the exhaust gas flow rate 700 is determined by the SCR catalyst inlet exhaust properties module 358 of current $NH_3$ storage level module 354 (see FIG. 11) or other similar module. The amount of $NH_3$ entering the AMOX catalyst 160 can be represented by an $NH_3$ input 712 and/or the current $NH_3$ slip 372. More specifically, in some implementations, the AMOX $NH_3$ conversion module 380 is communicable in data receiving communication with the current $NH_3$ storage level module 354 to receive the current $NH_3$ slip 372. In these implementations, the amount of $NH_3$ entering the AMOX catalyst 160 can be set to the current $NH_3$ slip 372. In some implementations, the control system 150 can include an $NH_3$ sensor between the SCR catalyst 152 and the AMOX catalyst 160. In these implementations, the amount of $NH_3$ entering the AMOX catalyst 160 can be set to the output of the $NH_3$ sensor. Alternatively, in certain instances, the amount of $NH_3$ entering the AMOX catalyst 160 can be set to a combination of the current $NH_3$ slip 372 and the output of the $NH_3$ sensor, such as an average of the current $NH_3$ slip 372 and the output of the $NH_3$ sensor. The AMOX $NH_3$ conversion module 380 can also be communicable in data receiving communication with various other sensors, such as temperature sensors 124D, 124E and $NO_x$ sensor 164C.

The AMOX $NH_3$ conversion module 380 includes several modules including, but not limited to, an AMOX catalyst bed temperature module 386, an $NO_2/NO_x$ ratio module 387, an AMOX catalyst degradation module 388, and a tailpipe $NH_3$ slip target module 389.

The AMOX catalyst bed temperature module 386 is operable to estimate the temperature of the AMOX catalyst bed. In one implementation, the AMOX catalyst bed temperature module 386 utilizes the input from the temperature sensors 124D, 124E to determine the difference between the temperature of the exhaust at the inlet of the AMOX catalyst 160 and the temperature of the exhaust at the outlet of the AMOX catalyst. Based at least partially on the temperature differential and mass flow rate properties of the exhaust gas stream, the AMOX catalyst bed temperature module 386 calculates the temperature of the AMOX catalyst bed. Alternatively, or in addition to estimating the AMOX catalyst bed temperature as described above, the SCR system 150 can include a temperature sensor (not shown) coupled to the AMOX catalyst 160. The AMOX catalyst bed temperature module 386 can utilize the output of the AMOX catalyst temperature sensor to determine the temperature of the AMOX catalyst bed.

Similar to the SCR catalyst $NO_2/NO_x$ ratio module 366 of the current $NH_3$ storage level module 354, the $NO_2/NO_x$ ratio module 387 of the AMOX $NH_3$ conversion module 380 is operable to determine the ratio of $NO_2$ to $NO_x$ according to Equation 1 above, where $NO_2$ is the amount of nitrogen dioxide at the inlet of the AMOX catalyst 160 and NO is the amount of nitrogen oxide at the inlet of the AMOX catalyst as sensed by the $NO_x$ sensor 164C.

Similar to the SCR catalyst degradation factor module 368 of current $NH_3$ storage level module 354, the AMOX catalyst degradation module 388 is operable to determine an AMOX catalyst degradation factor indicating the condition of the AMOX catalyst. In certain implementations, the catalyst degradation factor is determined by an algorithm that compares the conversion efficiency of the "aged" AMOX catalyst at predetermined engine operating conditions and urea dosing rates with the conversion efficiency of a "fresh" AMOX catalyst under the same predetermined conditions and dosing rates.

The tailpipe $NH_3$ slip target module 389 is operable to determine a tailpipe $NH_3$ slip target, i.e., the desired amount of $NH_3$ allowed to exit the AMOX catalyst 160. The tailpipe $NH_3$ slip target is based at least partially on a desired average amount of $NH_3$ slip from the AMOX catalyst and/or a desired maximum amount of $NH_3$ slip from the AMOX catalyst. In some instances, both the desired average amount of $NH_3$ slip from the AMOX catalyst and desired maximum amount of $NH_3$ slip from the AMOX catalyst are used to ensure that actual tailpipe slip levels remain below a human detectable threshold. Further, the tailpipe $NH_3$ slip target can be based on other factors, such as current emissions standards and customer-based specifications.

Based at least partially on at least one of the flow rate of exhaust, NOR, and ammonia entering the AMOX catalyst 160, the temperature of the AMOX catalyst bed, the ratio of $NO_2/NO_x$ at the inlet of the AMOX catalyst, the catalyst degradation factor, and the tailpipe $NH_3$ slip target, the AMOX $NH_3$ conversion module 380 estimates the AMOX $NH_3$ conversion capability 382, the tailpipe $NH_3$ slip 384, and the AMOX catalyst thermal mass 385. For example, in some implementations, the AMOX $NH_3$ conversion capability 382 and the tailpipe $NH_3$ slip 384 are dependent on the amount of $NO_x$ entering the AMOX catalyst, the temperature of the AMOX catalyst, and a space velocity of the AMOX catalyst. Further, in some instances, the AMOX catalyst thermal mass 385 is based at least partially on the geometric dimensions of the AMOX catalyst, and the material properties of the AMOX catalyst, such as the thermal conductivity and volumetric heat capacity of the AMOX catalyst. In some instances, the AMOX $NH_3$ conversion capability 382, the tailpipe $NH_3$ slip 384, and the AMOX catalyst thermal mass 385 can be estimated by accessing a multi-dimensional, pre-calibrated lookup table stored on the controller 130.

Generally, the higher the AMOX catalyst conversion capability 382, the more tolerance the SCR system 150 has to $NH_3$ slipping from the SCR catalyst 152. Accordingly, if the AMOX catalyst conversion capability 382 is relatively high, more $NH_3$ can be allowed to slip from the SCR catalyst 152. However, with more $NH_3$ slipping from the SCR catalyst 152, more $NH_3$ storage sites on the surface of the SCR catalyst 152 may be vacant, thus requiring an increase in the ammonia addition requirement 326. In such an instance, the $NH_3$ storage module 350 can increase the ammonia storage modifier 352, which in turn can increase the ammonia addition requirement 326. In contrast, when the AMOX catalyst conversion capability 382 is relatively low, less $NH_3$ slippage from the SCR catalyst 152 is tolerated, resulting in less $NH_3$ removed from storage on the SCR catalyst. If more $NH_3$ slips from the SCR catalyst 152 and the AMOX catalyst conversion capability 382 is relatively low, the tailpipe $NH_3$ slip may correspondingly increase. Therefore, in these instances, the $NH_3$ storage module 350 can decrease or hold steady the ammonia storage modifier 352 to decrease or hold-steady the ammonia addition requirement 326, and/or the AMOX $NH_3$ conversion module 380 can modulate the effectiveness of the AMOX catalyst 160, such that tailpipe $NH_3$ slip is controlled.

In some implementations, the AMOX catalyst thermal mass value 385 is dependent on the material properties of the AMOX catalyst bed, such as thermal conductivity and volumetric heat capacity. Generally, the thermal mass 385 is a measure of the AMOX catalyst's ability to conduct and store heat. The AMOX $NH_3$ conversion module 380 can communicate the AMOX catalyst thermal mass value 385 to the $NH_3$ storage module 350, which can use the thermal mass value in its determination of the ammonia storage modifier 352.

As described above, the AMOX $NH_3$ conversion capability and AMOX catalyst thermal mass 385 is communicated to and processed by various other modules of the controller 130. For example, the AMOX $NH_3$ conversion capability 382 and AMOX catalyst thermal mass 385 is received by the $NH_3$ storage module 350 and used to determine the ammonia storage modifier 352 (see FIG. 10). Further, the AMOX $NH_3$ conversion capability 382 is used by the corrected tailpipe $NO_x$ module 399 to determine the tailpipe $NO_x$ feedback value 399 (see FIG. 16).

The tailpipe $NH_3$ slip 384 determined by the AMOX embedded model $NH_3$ conversion module 380 can be communicated to other modules of the controller 130. For example, the determined tailpipe $NH_3$ slip 384 can be communicated to the reductant modifier module 390 (see FIG. 15) and corrected tailpipe $NO_x$ module 397 (see FIG. 16) to replace or supplement the tailpipe $NH_3$ slip measurement input communicated from the $NH_3$ sensor 166C. For example, in certain instances, the input value for the tailpipe $NH_3$ into the modules 390, 397 can be an average of the determined tailpipe $NH_3$ slip 384 and the tailpipe $NH_3$ slip measurement from the sensor 166C to provide a more accurate indication of the actual amount of $NH_3$ slipping from the tailpipe.

Reductant Modifier Module

Referring to FIG. 15, the reductant modifier module 390 is operable to determine a reductant modifier requirement 342 based at least in part on whether any of various reductant limiting conditions have been met. The reductant modifier module 390 includes a reducant modifier conditions module 394 and an SCR catalyst inlet exhaust properties module 395. Generally, the reductant modifier module 390 is operable to either reduce reductant dosing, prevent reductant dosing or leave reductant dosing unchanged when certain predetermined conditions of the exhaust aftertreatment system 100 are met.

The reductant modifier conditions module 394 is operable to monitor the operating conditions of the engine system 10 and determine if one or more reductant limiting conditions are met. In some embodiments, the reductant limiting conditions include, but are not limited to, an exhaust gas temperature limit, an ammonia slip reductant rate limit, and an SCR catalyst bed temperature limit.

Reductant dosing at high exhaust gas temperatures can cause cyanuric acid and polymers (e.g., melamine) to form on the injector and exhaust pipe walls, which can lead to performance degradation of and damage to the system. For example, the formation of melamine can clog the nozzle. To prevent cyanuric acid from forming, the reductant modifier module 390, including the reductant modifier conditions module 394, monitors the exhaust gas temperature and prevents reductant dosing, e.g., via instructions in the reductant modifier requirement 342, if the exhaust gas temperature exceeds a predetermined exhaust gas temperature limit. The current exhaust gas temperature can be sensed by at least one of the temperature sensors, e.g., exhaust temperature sensor 124C and/or predicted by an SCR catalyst inlet exhaust properties module 395 similar to module 358.

Reductant dosing at high SCR catalyst storage levels and SCR catalyst bed temperature ramps can cause ammonia to slip from the SCR catalyst 152. To reduce ammonia slip in these situations, the reductant modifier module 390 monitors the current $NH_3$ storage level 370 and the modulations of the SCR catalyst bed temperature as sensed by the temperature sensor 124D (or predicted by an SCR catalyst bed temperature module as described above). If the current $NH_3$ storage level 370 exceeds a predetermined $NH_3$ storage level associated with $NH_3$ slip, or if the modulation in SCR catalyst bed temperature exceeds a predetermined SCR catalyst bed temperature change, then the reductant modifier module reduces the reductant dosing rate, e.g., via instructions in the reductant modifier requirement, such that $NH_3$ slip from the SCR catalyst 152 is controlled.

The reductant modifier module 390 is also operable to prevent reductant dosing in the event a specific component or components of the SCR system 150 has malfunctioned or is otherwise not ready for operation.

Corrected Tailpipe $NO_x$ Module

Figure 16:
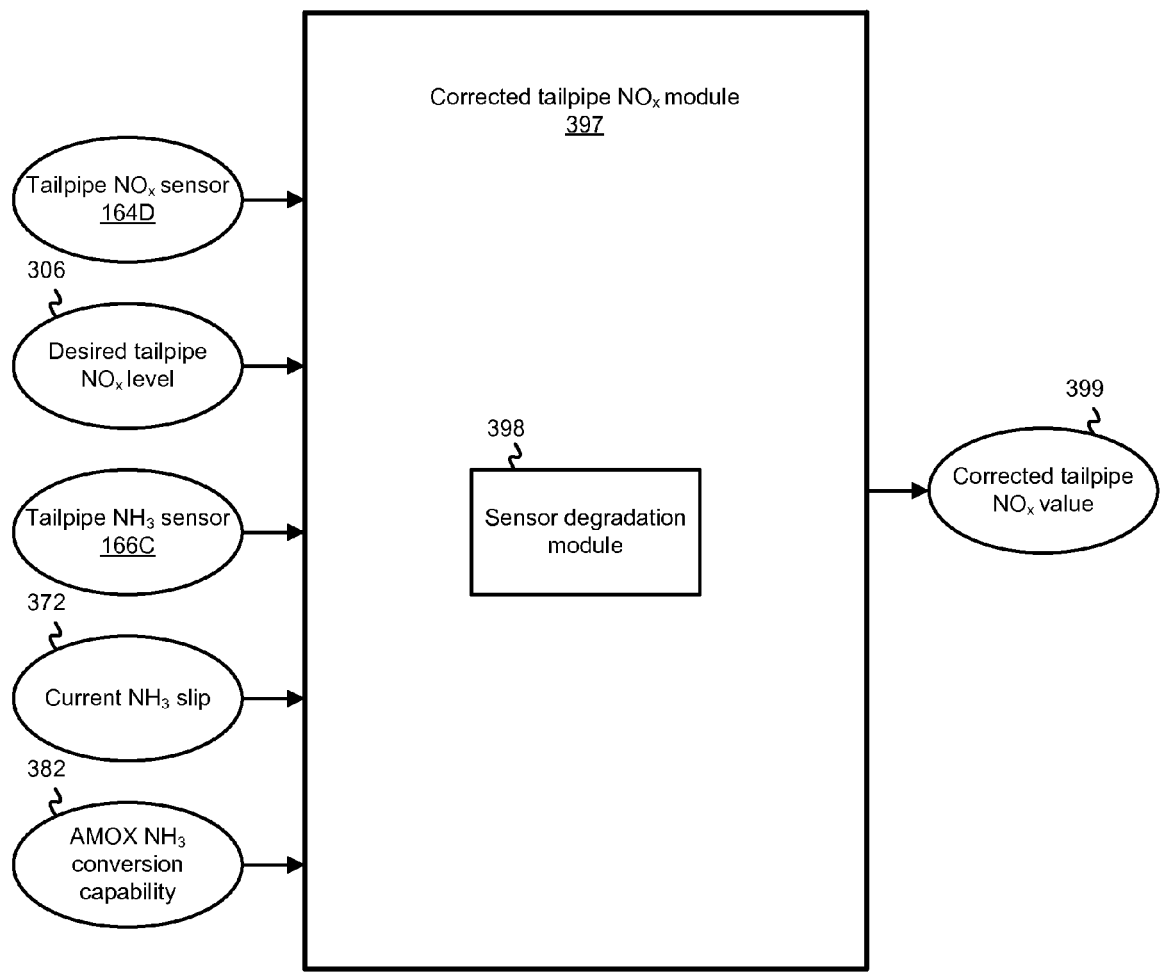
FIG. 16 is a schematic block diagram of a corrected tailpipe $NO_x$ module of the reductant modifier module of FIG. 15 according to one representative embodiment.

Referring to FIG. 16, the corrected tailpipe $NO_x$ module 397 of the controller 130 is operable to determine the corrected tailpipe $NO_x$ value 399. The corrected tailpipe $NO_x$ module 397 is communicable in data receiving communication with the tailpipe $NO_x$ sensor 164D and tailpipe $NH_3$ sensor 166C. The corrected tailpipe $NO_x$ module 397 is also communicable in data receiving communication with the current $NH_3$ storage level module 354 to receive the estimated current $NH_3$ slip 372 or the estimated amount of $NH_3$ exiting the SCR catalyst 152. Further, the corrected tailpipe $NO_x$ module 397 is communicable in data receiving communication with the AMOX $NH_3$ conversion module 380 to receive the AMOX $NH_3$ conversion capability 382. The corrected tailpipe $NO_x$ module 397 also includes a sensor degradation module 398 that is operable to determine a tailpipe $NO_x$ sensor degradation factor based at least partially on the type of sensor, age of sensor, and operating conditions of the engine system 10. In some instances, the tailpipe $NO_x$ sensor degradation factor is determined by an algorithm that compares the $NO_x$ sensor measurements at pre-determined operating conditions having known $NO_x$ values. The degradation factor indicates an amount, e.g., a percentage, the measured $NO_x$ sensor value should be adjusted to account for degradation of the $NO_x$ sensor and inaccuracies associated with the degraded $NO_x$ sensor measurements. In some implementations, the corrected tailpipe $NO_x$ value is about is about 10% higher than the measured tailpipe $NO_x$ value.

The corrected tailpipe $NO_x$ module 397 processes the sensed tailpipe $NO_x$ amount, the sensed tailpipe $NH_3$ amount, the estimated $NH_3$ slip 372, the $NO_x$ sensor degradation factor, and the AMOX conversion capability 382 to determine the corrected tailpipe $NO_x$ value 399. The corrected tailpipe $NO_x$ value 399 can replace the sensed amount of $NO_x$ detected by the tailpipe $NO_x$ sensor 164D in the reductant modifier requirement 342 calculation by the reductant modifier module 390 for a more accurate indication of the amount of $NO_x$ leaving the tailpipe and a more accurate reductant modifier requirement. Additionally, the corrected tailpipe $NO_x$ value 399 can be communicated to and processed by the current $NH_3$ storage level module 354.

Exemplary Method for Reducing $NO_x$ Emissions

Figure 17:
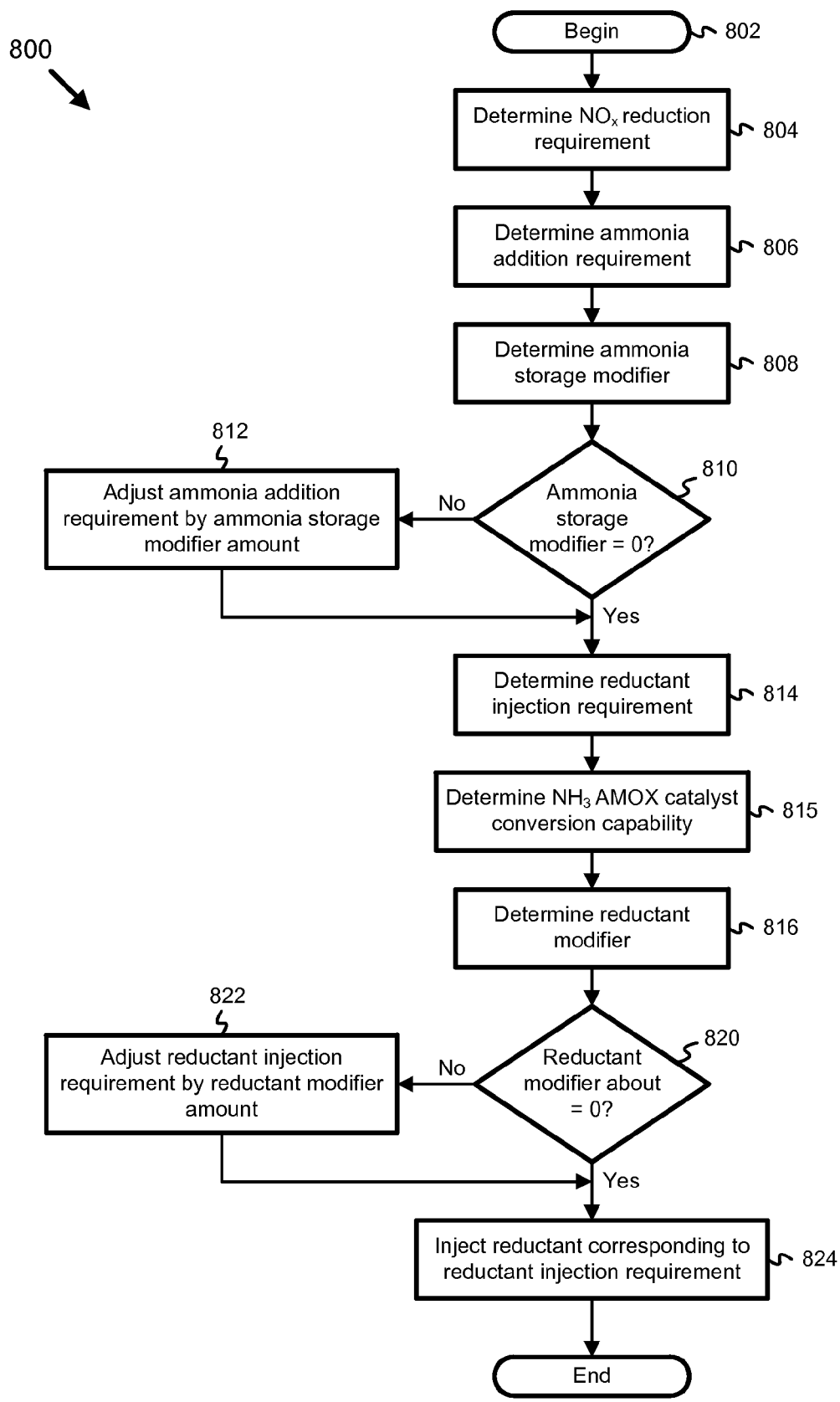
FIG. 17 is a method of reducing $NO_x$ emissions using ammonia storage on an SCR catalyst.

Referring to FIG. 17, and according to one representative embodiment, a method 800 for reducing $NO_x$ emissions using ammonia storage on an SCR catalyst is shown. The method 800 starts at 802 and includes determining 804 a $NO_x$ reduction requirement. In some implementations, determining 804 a $NO_x$ reduction requirement includes operating the $NO_x$ reduction target module 300 to estimate the $NO_x$ reduction requirement 304. The method 800 also includes determining 806 an ammonia addition requirement. In some implementations, determining 806 an ammonia addition requirement includes operating the ammonia target module 310 to estimate the ammonia addition requirement 326. The method 800 further includes determining 808 an ammonia storage modifier. In some implementations, determining 808 an ammonia storage modifier includes operating the NH$_3$ storage module 350 to estimate the ammonia storage modifier 352.

After an ammonia storage modifier is determined, the method 800 includes comparing 810 the ammonia storage modifier to a predetermined value, such as zero. If the ammonia storage modifier is greater than or less than the predetermined value, then the method 800 includes adjusting 812, such as by adding, the ammonia addition requirement determined at 808 by an amount corresponding to the ammonia storage modifier amount. If the ammonia storage modifier is approximately equal to the predetermined value, then the ammonia addition requirement determined at 808 is not adjusted. The method 800 includes determining 814 a reductant injection requirement 814 based on either the ammonia addition requirement determined at 808 or the adjusted addition requirement determined at 812. In some implementations, determining 814 a reductant injection requirement includes operating the reductant target module 330 to calculate the reduction injection requirement 332. The method 800 can also include determining 815 an AMOX catalyst NH$_3$ conversion capability 382 by operation of the AMOX NH$_3$ conversion module 380.

The method 800 further includes determining 816 a reductant modifier. In some implementations, determining 816 a reductant modifier includes operating the reductant modifier module 390 to calculate the reductant modifier requirement 342. After a reductant modifier is determined, the method 800 includes comparing 820 the reductant modifier to a predetermined value, such as zero. If the reductant modifier is greater than or less than the predetermined value, then the method 800 includes adjusting 822 the reductant injection requirement determined at 816 by an amount corresponding to the reductant modifier amount. If the reductant modifier is approximately equal to the predetermined value, then the reductant injection requirement determined at 808 is not adjusted. The method includes injecting 824 an amount of reductant corresponding to the reductant injection requirement determined at either 816 or 822 into the exhaust gas stream.

The schematic flow chart diagrams and method schematic diagrams described above are generally set forth as logical flow chart diagrams. As such, the depicted order and labeled steps are indicative of representative embodiments. Other steps and methods may be conceived that are equivalent in function, logic, or effect to one or more steps, or portions thereof, of the methods illustrated in the schematic diagrams. Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for reducing NO$_x$ emissions in an engine exhaust gas stream, comprising:

a NO$_x$ reduction target module configured to determine a NO$_x$ reduction requirement, the NO$_x$ reduction requirement comprising an amount of NO$_x$ in the exhaust gas stream to be reduced on a selective catalytic reduction (SCR) catalyst having a catalyst bed;

an ammonia storage module configured to determine an ammonia storage modifier by comparing a current ammonia storage level and a target ammonia storage level, wherein the ammonia storage module comprises an ammonia adsorption look-up table and an ammonia desorption look-up table each including predetermined time constants corresponding to various reductant addition rates and SCR catalyst bed temperatures, wherein the ammonia storage module is configured to determine the current ammonia storage level by utilizing a time constant selected from one of the tables, and wherein the time constant is selected from the ammonia adsorption look-up table when the SCR catalyst is in an ammonia adsorption mode and from the ammonia desorption table when the SCR catalyst is in an ammonia desorption mode;

an ammonia target module configured to determine an ammonia addition requirement, the ammonia addition requirement comprising an amount of ammonia added to the exhaust gas stream to achieve the NO$_x$ reduction requirement, wherein the ammonia target module is communicable in data receiving communication with the ammonia storage module to receive the ammonia storage modifier, and wherein the ammonia target module is configured to add the ammonia storage modifier to the ammonia addition requirement; and a reductant target module configured to determine a reductant injection requirement, the reductant injection requirement comprising an amount of reductant added to the exhaust gas stream to achieve the ammonia addition requirement;

wherein at least one of the NO$_x$ reduction target module, ammonia storage module, ammonia target module, and reductant target module comprises at least one of logic hardware and executable code, the executable code being stored on at least one non-transitory machine-readable storage media.

2. The apparatus of claim 1, wherein the ammonia storage module is configured to determine the current ammonia storage level, an estimated amount of ammonia slipping from the SCR catalyst, and an estimated maximum ammonia storage capacity of the SCR catalyst, and wherein the ammonia storage modifier is a function of the current ammonia storage level, the estimated amount of ammonia slipping from the SCR catalyst, and the estimated maximum ammonia storage capacity of the SCR catalyst.

3. The apparatus of claim 2, wherein the current ammonia storage level is a function of the rate at which reductant is added to the exhaust gas stream, an estimated temperature of the SCR catalyst bed, the estimated maximum ammonia storage capacity of the SCR catalyst, and whether the SCR catalyst is in an ammonia desorption mode or an ammonia adsorption mode.

4. The apparatus of claim 1, wherein the ammonia storage module is configured to determine the amount of ammonia stored on the SCR catalyst by utilizing the selected time constant in a first order dynamics equation.

5. The apparatus of claim 2, wherein the ammonia storage module is configured to determine an ammonia storage level target, and wherein the ammonia storage modifier is a function of the ammonia storage level target.

6. The apparatus of claim 5, wherein the ammonia storage modifier comprises a positive value if the ammonia storage level target exceeds the current ammonia storage level, and wherein the ammonia storage modifier comprises a negative value if the current ammonia storage level exceeds the ammonia storage level target.

7. The apparatus of claim 5, wherein the ammonia storage module is configured to determine the ammonia storage level target by multiplying the estimated maximum ammonia storage capacity by an ammonia storage level fraction.

8. The apparatus of claim 7, wherein the ammonia storage level fraction comprises a fraction selected from the set of fractions consisting of: fifty percent, seventy-five percent, ninety percent, and one-hundred percent.

9. The apparatus of claim 2, wherein the estimated amount of ammonia slipping from the SCR catalyst is a function of a ratio of NO to NO2 in the exhaust gas before and after the SCR catalyst, the amount of $NO_x$ in the exhaust gas before the SCR catalyst, the amount of ammonia in the exhaust gas before the SCR catalyst, the current ammonia storage level, and the estimated maximum ammonia storage capacity of the SCR catalyst.

10. The apparatus of claim 2, wherein the ammonia storage module is configured to determine an amount of excess ammonia within the SCR catalyst and an amount of ammonia desorbed within the SCR catalyst, wherein when the current ammonia storage level is greater than the estimated maximum ammonia storage capacity of the SCR catalyst, the estimated amount of ammonia slipping from the SCR catalyst is approximately equal to the amount of excess ammonia within the SCR catalyst and the amount of ammonia desorbed from the SCR catalyst.

11. The apparatus of claim 2, wherein the ammonia storage module is configured to:
    increase the ammonia storage modifier as the current ammonia storage level decreases and the estimated amount of ammonia slipping from the SCR catalyst decreases; and
    decrease the ammonia storage modifier as the current ammonia storage level increases and the estimated amount of ammonia slipping from the SCR catalyst increases.

12. The apparatus of claim 1, wherein:
    each of the predetermined time constants of the ammonia adsorption look-up table is based on the amount of time between a reductant dosing event and corresponding ammonia slippage from an SCR catalyst following the reductant dosing event; and
    each of the predetermined time constants of the ammonia desorption look-up table is based on the amount of time between discontinuation of a reductant dosing event and an SCR catalyst outlet $NO_x$ concentration being equal to an engine outlet $NO_x$ concentration following the reductant dosing event.

13. A system for reducing $NO_x$ emissions in an engine exhaust gas stream, the system comprising:
    a selective catalytic reduction (SCR) catalyst operable to reduce $NO_x$ emissions in the exhaust gas stream in the presence of a reductant;
    a reductant injector that injects reductant into the exhaust gas stream upstream of the SCR catalyst;
    a controller comprising:
        a $NO_x$ reduction target module configured to determine a $NO_x$ reduction requirement, the $NO_x$ reduction requirement comprising an amount of $NO_x$ in the exhaust gas stream to be reduced on the SCR catalyst;
        an ammonia storage module configured to determine an ammonia storage modifier by comparing a current ammonia storage level and a target ammonia storage level, wherein the ammonia storage module comprises an ammonia adsorption look-up table and an ammonia desorption look-up table each including predetermined time constants corresponding to various reductant addition rates and SCR catalyst bed temperatures, wherein the ammonia storage module is configured to determine the current ammonia storage level by utilizing a time constant selected from one of the tables, and wherein the time constant is selected from the ammonia adsorption look-up table when the SCR catalyst is in an ammonia adsorption mode and from the ammonia desorption table when the SCR catalyst is in an ammonia desorption mode;
        an ammonia target module configured to determine an ammonia addition requirement, the ammonia addition requirement comprising an amount of ammonia added to the exhaust gas stream to achieve the $NO_x$ reduction requirement, wherein the ammonia target module is communicable in data receiving communication with the ammonia storage module to receive the ammonia storage modifier, and wherein the ammonia target module is configured to add the ammonia storage modifier to the ammonia addition requirement; and
        a reductant target module configured to determine a reductant injection requirement, the reductant injection requirement comprising an amount of reductant added to the exhaust gas stream to achieve the ammonia addition requirement;
    wherein the ammonia storage module is further configured to determine whether the SCR catalyst is in the ammonia adsorption mode or ammonia desorption mode by comparing a maximum ammonia storage capacity of the SCR catalyst with a predetermined ammonia storage level of the SCR catalyst.

14. The system of claim 13, wherein the ammonia storage module is configured to determine the current ammonia storage level, and an estimated maximum ammonia storage capacity of the SCR catalyst, and wherein the ammonia storage modifier is a function of the current ammonia storage level, the estimated amount of ammonia slipping from the SCR catalyst, and the estimated maximum ammonia storage capacity of the SCR catalyst.

15. A method for reducing $NO_x$ emissions in an engine exhaust gas stream, the method comprising:
    determining a $NO_x$ reduction requirement, the $NO_x$ reduction requirement comprising an amount of $NO_x$ in the exhaust gas stream to be reduced on a selected catalytic reduction (SCR) catalyst having a catalyst bed;
    determining an ammonia addition requirement, the ammonia addition requirement comprising an amount of ammonia added to the exhaust gas stream to achieve the $NO_x$ reduction requirement;
    determining an estimated amount of ammonia stored on the SCR catalyst, an estimated amount of ammonia slipping from the SCR catalyst, and an estimated maximum ammonia storage capacity of the SCR catalyst, wherein determining the estimated amount of ammonia stored on the SCR catalyst comprises selecting a time constant from one of an ammonia adsorption look-up table and an ammonia desorption look-up table, and utilizing the selected time constant in a first order dynamics equation, and wherein the time constant is selected from the ammonia adsorption look-up table when ammonia is adsorbing on the SCR catalyst bed and the time constant is selected from the ammonia desorption look-up table when ammonia is desorbing from the SCR catalyst bed;

determining an ammonia storage modifier based at least partially on the estimated amount of ammonia stored on the SCR catalyst, the estimated amount of ammonia slipping from the SCR catalyst, and the estimated maximum ammonia storage capacity of the SCR catalyst;

adding the ammonia storage modifier to the ammonia addition requirement;

determining a reductant injection requirement, the reductant injection requirement comprising an amount of reductant added to the exhaust gas stream to achieve the ammonia addition requirement; and injecting the amount of reductant into the exhaust gas stream in response to the determined reductant injection requirement;

wherein the first order dynamics equation comprises $$NH_3 Storage_{MAX}\left(\frac{1}{\tau s + 1}\right), \text{ and}$$

wherein $NH_3 Storage_{MAX}$ is a maximum ammonia storage capacity of the SCR catalyst, $\tau$ is the time constant selected from one of the tables, and s is a Laplace transform complex variable.

16. The method of claim 15, wherein determining the estimated amount of ammonia stored on the SCR catalyst comprises:

determining the rate at which reductant is added to the exhaust gas stream and the temperature of the SCR catalyst bed; and calculating the estimated amount of ammonia stored on the SCR catalyst based at least partially on the rate at which reductant is added to the exhaust stream, the temperature of the SCR catalyst bed, and the maximum ammonia storage capacity of the SCR catalyst.

17. The method of claim 15, further comprising determining an ammonia storage level target, wherein the ammonia storage modifier comprises a positive value if the ammonia storage level target exceeds the estimated amount of ammonia stored on the SCR catalyst, and wherein the ammonia storage modifier comprises a negative value if the estimated amount of ammonia stored on the SCR catalyst exceeds the ammonia storage level target.

18. The method of claim 17, wherein determining the ammonia storage level target comprises multiplying the estimated maximum ammonia storage capacity of the SCR catalyst by an ammonia storage level fraction.

19. The method of claim 18, wherein the ammonia storage level fraction comprises a fraction selected from the set of fractions consisting of: fifty percent, seventy-five percent, ninety percent, and one-hundred percent.

20. The method of claim 15, wherein determining the estimated amount of ammonia slipping from the SCR catalyst comprises:

determining a ratio of NO to NO2 in the exhaust gas before and after the SCR catalyst, the amount of $NO_x$ in the exhaust gas before the SCR catalyst, and the amount of ammonia in the exhaust gas before the SCR catalyst; and calculating the estimated amount of ammonia slipping from the SCR catalyst based at least partially on the ratio of NO to NO2 in the exhaust gas before and after the SCR catalyst, the amount of $NO_x$ in the exhaust gas before the SCR catalyst, the amount of ammonia in the exhaust gas before the SCR catalyst, the estimated amount of ammonia stored on the SCR catalyst, and the estimated maximum ammonia storage capacity of the SCR catalyst.

21. The method of claim 15, further comprising determining an amount of excess ammonia within the SCR catalyst and an amount of ammonia desorbed within the SCR catalyst, wherein when the estimated amount of ammonia stored on the SCR catalyst is greater than the estimated maximum ammonia storage capacity of the SCR catalyst, determining the estimated amount of ammonia slipping from the SCR catalyst comprises adding together the amount of excess ammonia within the SCR catalyst and the amount of ammonia desorbed within the SCR catalyst.

22. The method of claim 15, wherein determining the ammonia storage modifier comprises:

increasing the ammonia storage modifier as the estimated amount of ammonia stored on the SCR catalyst decreases and the estimated amount of ammonia slipping from the SCR catalyst decreases; and decreasing the ammonia storage modifier as the estimated amount of ammonia stored on the SCR catalyst increases and the estimated amount of ammonia slipping from the SCR catalyst increases.

* * * * *